United States Patent
Choi et al.

(10) Patent No.: US 12,262,039 B2
(45) Date of Patent: Mar. 25, 2025

(54) IMAGE DECODING DEVICE USING TOOL SET AND IMAGE DECODING METHOD THEREBY, AND IMAGE ENCODING DEVICE AND IMAGE ENCODING METHOD THEREBY

(71) Applicant: SAMSUNG ELECTRONICS CO., LTD., Suwon-si (KR)

(72) Inventors: Woongil Choi, Suwon-si (KR); Minwoo Park, Suwon-si (KR); Kwangpyo Choi, Suwon-si (KR); Kiho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 173 days.

(21) Appl. No.: 17/713,693

(22) Filed: Apr. 5, 2022

(65) Prior Publication Data
US 2022/0232237 A1 Jul. 21, 2022

Related U.S. Application Data

(63) Continuation of application No. PCT/KR2020/013555, filed on Oct. 6, 2020.
(Continued)

(30) Foreign Application Priority Data

Sep. 17, 2020 (KR) .................. 10-2020-0119872

(51) Int. Cl.
*H04N 19/176* (2014.01)
*H04N 19/184* (2014.01)
(Continued)

(52) U.S. Cl.
CPC ........... *H04N 19/46* (2014.11); *H04N 19/176* (2014.11); *H04N 19/184* (2014.11); *H04N 19/189* (2014.11)

(58) Field of Classification Search
CPC .... H04N 19/46; H04N 19/176; H04N 19/184; H04N 19/189
See application file for complete search history.

(56) References Cited

U.S. PATENT DOCUMENTS 9,402,083 B2 7/2016 Boyce
9,451,256 B2 9/2016 Chen
(Continued)

FOREIGN PATENT DOCUMENTS

EP 1230802 B1 1/2004
JP 2018534827 A 11/2018
(Continued)

OTHER PUBLICATIONS

Zhao et al. (Joint Video Experts Team (JVET of ITU=TSG 16 WP 3 and ISO/IEC JTC 1/SC 29/WG 11 14 Meeting: Geneva, CH Mar. 19-27, 2019;—Title: Non-CE6: Configurable max transform size in VVC) (Year: 2019).*
(Continued)

Primary Examiner — Chikaodili E Anyikire
Assistant Examiner — Berteau Joisil
(74) Attorney, Agent, or Firm — Sughrue Mion, PLLC

(57) ABSTRACT

An image decoding method may include: receiving a bitstream generated as a result of encoding an image sequence; obtaining, from a sequence parameter set of the bitstream, a first tool set index indicating a tool allowed to decode the bitstream among a plurality of tools; obtaining, from the sequence parameter set, tool flags based on the tool flags, identifying a tool that has been used to encode the image sequence among the plurality of tools; and reconstructing
(Continued)

the image sequence based on the identified tool, wherein values of the tool flags are set according to a value of the first tool set index.

4 Claims, 28 Drawing Sheets

Related U.S. Application Data

(60) Provisional application No. 62/913,264, filed on Oct. 10, 2019.

(51) Int. Cl.
  *H04N 19/189* (2014.01)
  *H04N 19/46* (2014.01)

(56) References Cited

U.S. PATENT DOCUMENTS

| | | | |
|---|---|---|---|
| 10,477,183 B2 | 11/2019 | Chang et al. | |
| 10,623,774 B2 | 4/2020 | Zhao et al. | |
| 10,750,196 B2 | 8/2020 | Li et al. | |
| 11,252,428 B2 | 2/2022 | Li et al. | |
| 2010/0061444 A1 | 3/2010 | Wilkins et al. | |
| 2012/0114034 A1 | 5/2012 | Huang et al. | |
| 2014/0294067 A1* | 10/2014 | Li | H04N 19/174 |
| | | | 375/240.02 |
| 2019/0273935 A1 | 9/2019 | Li et al. | |
| 2021/0297697 A1 | 9/2021 | Hannuksela | |
| 2021/0409779 A1* | 12/2021 | Li | H04N 19/172 |
| 2022/0286693 A1* | 9/2022 | Tsukuba | H04N 19/33 |

FOREIGN PATENT DOCUMENTS

| KR | 20020064899 A | 8/2002 |
|---|---|---|
| KR | 1020140008984 A | 1/2014 |
| KR | 10-2014-0093255 A | 7/2014 |
| KR | 1020150036599 A | 4/2015 |
| KR | 10-2016-0132089 A | 11/2016 |
| KR | 1020170058443 A | 5/2017 |
| KR | 1020180120200 A | 11/2018 |

OTHER PUBLICATIONS

Rusanovskyy et al. (ISO/TEC JTCLU/SC29/WG11 MPEG2018/m51483 Oct. 2019, Geneva, Switzerland Source Qualcomm, Divideon, Samsung, Zetacast;—Title: [EVC] On enabling toolset signaling for EVC, hereinafter "Rusanovskyy."*

Communication dated Jul. 27, 2022 issued by the Korean Intellectual Property Office, corresponding to KR Patent Application No. 10-2020-0119872.

Xin Zhao et al., 'Non-CE6: Configurable max transform size in VVC', (JVET-N0362-v2), JVET of ITU-T SG 16 WP 3 and ISO/IEC JTC 1/SC29/WG 11 14th Meeting: Geneva, CH, (Mar. 17, 2019); Total 8 pages.

International Search Report (PCT/ISA/210) and Written Opinion (PCT/ISA/237) dated Dec. 30, 2020 issued by the International Searching Authority in International Application No. PCT/KR2020/013555.

Communication dated Oct. 25, 2022 issued by the Korean Intellectual Property Office in application No. 10-2020-0119872.

Rusanovskyy et al., "[EVC] On enabling toolset signalling for EVC", International Organization for Standarisation ISO/IEC JTC1/SC29/WG11 Coding of Moving Pictures and Audio, Oct. 9, 2019, 5 total pages.

Choi, and Rusanovskyy et al., "Text of ISO/IEC CD 23094-1, Essential Video Coding", International Organization for Standarisation ISO/IEC JTC1/SC29/WG11 Coding of Moving Pictures and Audio, Jul. 22, 2019, 292 total pages.

Chernyak et al., "Suggested Improvements for WD and TM", International Organization for Standarisation ISO/IEC JTC1/SC29/WG11 Coding of Moving Pictures and Audio, Jan. 12, 2020, 13 total pages.

Extended European Search Report dated Oct. 4, 2023, issued by European Patent Office in European Patent Application No. 20874414.4.

Communication issued on Mar. 11, 2024 by the Intellectual property India for Indian Patent Application No. 202247024505.

\* cited by examiner

FIG. 4
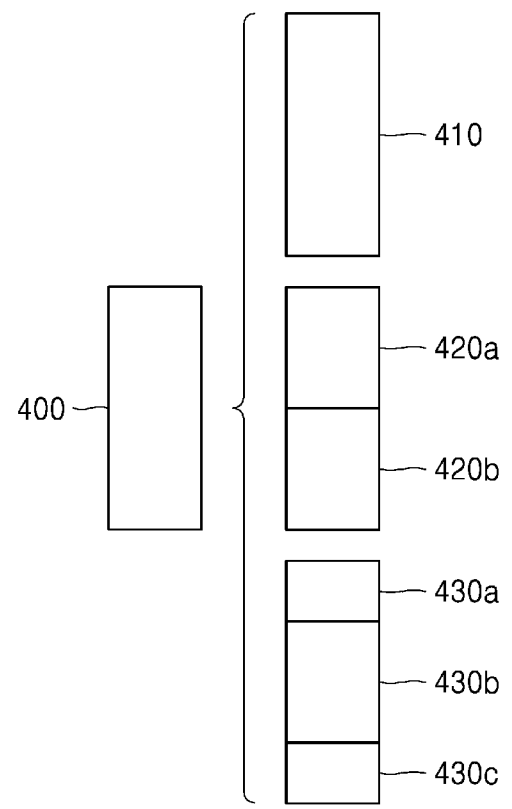
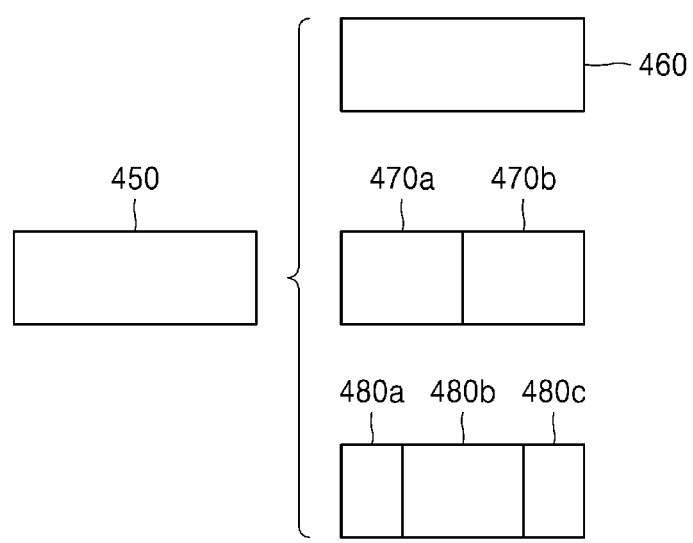

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 17

| SQUARE BLOCK | |
|---|---|
| (00)b | □ |
| (01)b | ⊞ |
| (10)b | ⊟ |
| (11)b | ⊡ |

| NON-SQUARE BLOCK | |
|---|---|
| (0)b | ▭ ▯ |
| (10)b | ▭▭ ▯▯ |
| (11)b | ▭▭▭ ▯▯▯ |

FIG. 18

| SQUARE BLOCK | |
|---|---|
| (00)b | □ |
| (10)b | ▭ |
| (11)b | ▯ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

FIG. 22

| BIT INDEX | TOOL |
|---|---|
| 0 | btt |
| 1 | suco |
| 2 | amvr |
| 3 | mmvd |
| 4 | affine |
| 5 | dmvr |
| 6 | alf |
| 7 | admvp |
| 8 | eipd |
| 9 | adcc |
| 10 | ibc |
| 11 | iqt |
| 12 | htdf |
| 13 | addb |
| 14 | cm_init |
| 15 | ats |
| 16 | rpl |
| 17 | pocs |
| 18 | dquant |
| 19 | dra |
| 20 | hmvp |
| 21 ... 31 | reserved |

FIG. 23

| | Descriptor |
|---|---|
| split_unit( x0, y0, log2CbWidth, log2CbHeight, ctDepth, splitUnitOrder, cuQpDeltaCode, predModeConstraintCurrent ) { | |
|   if( sps_btt_flag == 0 ) { | |
|     if( log2CbWidth > 2 \|\| log2CbHeight > 2 ) | |
|       split_cu_flag[ x0 ][ y0 ] — S2310 | ae(v) |
|   } | |
|   else if( sps_btt_flag == 1 ) { | |
|     if( ( log2CbWidth > 2 \|\| log2CbHeight > 2 ) && | |
|       x0 + ( 1 << log2CbWidth ) <= pic_width_in_luma_samples && | |
|       y0 + ( 1 << log2CbHeight ) <= pic_height_in_luma_samples ) { | |
|       if( allowSplitBtVer \|\| allowSplitBtHor \|\| allowSplitTtVer \|\| allowSplitTtHor ) | |
|         btt_split_flag[ x0 ][ y0 ] — S2320 | ae(v) |
|       if( btt_split_flag[ x0 ][ y0 ] ) { | |
|         if( ( allowSplitBtVer \|\| allowSplitTtVer ) && | |
|         ( allowSplitBtHor \|\| allowSplitTtHor ) ) | |
|           btt_split_dir[ x0 ][ y0 ] — S2330 | ae(v) |
|         if( btt_split_dir[ x0 ][ y0 ] && allowSplitBtVer && allowSplitTtVer ) \|\| | |
|         ( !btt_split_dir[ x0 ][ y0 ] && allowSplitBtHor && allowSplitTtHor ) ) | |
|           btt_split_type[ x0 ][ y0 ] — S2340 | ae(v) |
|       } | |

FIG. 24

| seq_parameter_set_rbsp( ) { | Descriptor |
|---|---|
| profile_idc | u(8) |
| level_idc | u(8) |
| toolset_idc_h | u(32) |
| toolset_idc_l | u(32) |
| sps_btt_flag | u(1) |
| sps_suco_flag | u(1) |
| sps_admvp_flag | u(1) |
| if( sps_admvp_flag ) { | |
|     sps_affine_flag | u(1) |
|     sps_amvr_flag | u(1) |
|     sps_dmvr_flag | u(1) |
|     sps_mmvd_flag | u(1) |
|     sps_hmvp_flag | u(1) |
| } | |
| sps_eipd_flag | u(1) |
| if( sps_eipd_flag ) { | |
|     sps_ibc_flag | u(1) |
| } | |
| sps_cm_init_flag | u(1) |
| if( sps_cm_init_flag ) | |
|     sps_adcc_flag | u(1) |
| sps_iqt_flag | u(1) |
| if( sps_iqt_flag ) | |
|     sps_ats_flag | u(1) |
| sps_addb_flag | u(1) |
| sps_alf_flag | u(1) |
| sps_htdf_flag | u(1) |
| sps_rpl_flag | u(1) |
| sps_pocs_flag | u(1) |
| sps_dquant_flag | u(1) |
| sps_dra_flag | u(1) |
| } | |

S2410 — profile_idc
S2420 — level_idc
S2430 — toolset_idc_h
S2440 — toolset_idc_l
S2450 — sps_eipd_flag group

FIG. 25

| BIT INDEX | SPS tool flag | Conformance requirement |
|---|---|---|
| 0 | sps_btt_flag | sps_btt_flag <= toolset_idc_h & 0x1 && <br> sps_btt_flag >= toolset_idc_l & 0x1 |
| 1 | sps_suco_flag | sps_suco_flag <= ( toolset_idc_h & 0x2 ) >> 1 && <br> sps_suco_flag >= ( toolset_idc_l & 0x2 ) >> 1 |
| 2 | sps_amvr_flag | sps_amvr_flag <= ( toolset_idc_h & 0x4 ) >> 2 && <br> sps_amvr_flag >= ( toolset_idc_l & 0x4 ) >> 2 |
| 3 | sps_mmvd_flag | sps_mmvd_flag <= ( toolset_idc_h & 0x8 ) >> 3 && <br> sps_mmvd_flag >= ( toolset_idc_l & 0x8 ) >> 3 |
| 4 | sps_affine_flag | sps_affine_flag <= ( toolset_idc_h & 0x10 ) >> 4 && <br> sps_affine_flag >= ( toolset_idc_l & 0x10 ) >> 4 |
| 5 | sps_dmvr_flag | sps_dmvr_flag <= ( toolset_idc_h & 0x20 ) >> 5 && <br> sps_dmvr_flag >= ( toolset_idc_l & 0x20 ) >> 5 |
| 6 | sps_alf_flag | sps_alf_flag <= ( toolset_idc_h & 0x40 ) >> 6 && <br> sps_alf_flag >= ( toolset_idc_l & 0x40 ) >> 6 |
| 7 | sps_admvp_flag | sps_admvp_flag <= ( toolset_idc_h & 0x80 ) >> 7 && <br> sps_admvp_flag >= ( toolset_idc_l & 0x80 ) >> 7 |
| ... | ... | ... |
| 14 | sps_cm_init_flag | sps_cm_init_flag <= ( toolset_idc_h & 0x4000 ) >>14 && <br> sps_cm_init_flag >= ( toolset_idc_l & 0x4000 ) >>14 |
| 15 | sps_ats_flag | sps_ats_flag <= ( toolset_idc_h & 0x8000 ) >> 15 && <br> sps_ats_flag >= ( toolset_idc_l & 0x8000 ) >> 15 |
| 16 | sps_rpl_flag | sps_rpl_flag <= ( toolset_idc_h & 0x10000 ) >> 16 && <br> sps_rpl_flag >= ( toolset_idc_l & 0x10000 ) >> 16 |
| 17 | sps_pocs_flag | sps_pocs_flag <= ( toolset_idc_h & 0x20000 ) >> 17 && <br> sps_pocs_flag >= ( toolset_idc_l & 0x20000 ) >> 17 |
| 18 | sps_dquant_flag | sps_dquant_flag <= ( toolset_idc_h & 0x40000 ) >> 18 && <br> sps_dquant_flag >= ( toolset_idc_l & 0x40000 ) >> 18 |
| 19 | sps_dra_flag | sps_dra_flag <= ( toolset_idc_h & 0x80000 ) >> 19 && <br> sps_dra_flag >= ( toolset_idc_l & 0x80000 ) >> 19 |
| 20 | sps_hmvp_flag | sps_hmvp_flag <= ( toolset_idc_h & 0x100000 ) >> 20 && <br> sps_hmvp_flag >= ( toolset_idc_l & 0x100000 ) >> 20 |
| 21..31 | Reserved | |

IMAGE DECODING DEVICE USING TOOL SET AND IMAGE DECODING METHOD THEREBY, AND IMAGE ENCODING DEVICE AND IMAGE ENCODING METHOD THEREBY

CROSS-REFERENCE TO RELATED APPLICATION

This application is a continuation application of International Patent Application No. PCT/KR2020/013555 filed on Oct. 6, 2020, which claims priority from U.S. Provisional Patent Application No. 62/913,264 filed on Oct. 10, 2019 in the United States Patent and Trademark Office, and Korean Patent Application No. 10-2020-0119872 filed on Sep. 17, 2020, in the Korean Intellectual Property Office, the disclosures of which are incorporated herein by reference in its entireties.

BACKGROUND

1. Field

The disclosure relates to the fields of image encoding and decoding. More particularly, the disclosure relates to an apparatus and method for decoding an image and an apparatus and method for encoding an image by using a set of tools selected from among a plurality of tools.

2. Description of the Related Art

In image encoding and decoding, an image is split into blocks, and each block is prediction-encoded and prediction-decoded through inter prediction or intra prediction.

Inter prediction is a technique for compressing an image by removing temporal redundancy between images. In inter prediction, blocks of a current image are predicted by using a reference image. A reference block that is most similar to a current block may be searched for within a certain search range in the reference image. The current block is predicted based on the reference block, and a prediction block generated as a predicted result is subtracted from the current block to generate a residual block.

In a codec such as H.264 advanced video coding (AVC) and high efficiency video coding (HEVC), in order to predict a motion vector of a current block, a motion vector of previously encoded blocks adjacent to the current block or of blocks included in a previously encoded image is used as a prediction motion vector of the current block. A differential motion vector, which is a difference between the motion vector of the current block and the prediction motion vector is signaled to a decoder side through a certain method.

Intra prediction is a technique for compressing an image by removing spatial redundancy in the image. Intra prediction generates a prediction block based on adjacent pixels of a current block according to a prediction mode. Also, a residual block is generated by subtracting the prediction block from the current block.

The residual block generated as a result of inter prediction or intra prediction is transformed and quantized and then transmitted to a decoder. The decoder reconstructs the current block by inverse quantizing and inverse transforming the residual block, and summing the prediction block of the current block and the residual block. In certain cases, the decoder removes artifacts in the reconstructed block by filtering the reconstructed current block.

SUMMARY

According to an aspect of the disclosure, an image decoding method performed by an image decoding apparatus, may include: receiving a bitstream generated as a result of encoding an image sequence; obtaining, from a sequence parameter set of the bitstream, a first tool set index indicating a tool allowed to decode the bitstream among a plurality of tools; obtaining, from the sequence parameter set, tool flags indicating whether the plurality of tools have been used to encode the image sequence; based on the tool flags, identifying a tool that has been used to encode the image sequence among the plurality of tools; and reconstructing the image sequence based on the identified tool, wherein values of the tool flags may be set according to a value of the first tool set index.

The first tool set index may be represented as a first bit string, and the tool allowed to decode the bitstream may be identified according to a value of each bit constituting the first bit string.

Each bit constituting the first bit string indicates whether each of the plurality of tools is allowed to decode the bitstream. When the first bit string has a bit having a value of 1, a tool corresponding to the bit having the value of 1 is identified as a tool allowed to decode the bitstream, and when the first bit string has a bit having a value of 0, a tool corresponding to the bit having the value of 0 is identified as a tool not allowed to decode the bitstream.

When the first bit string has the bit having the value of 1, a value of a tool flag corresponding to the bit having the value of 1 is 0 or 1.

When the first bit string has the bit having the value of 0, a value of a tool flag corresponding to the bit having the value of 0 is set to 0.

The image decoding method may further include obtaining, from the sequence parameter set, a second tool set index indicating a tool that has been used for the image sequence among the plurality of tools. The values of the tool flags may be set according to the value of the first tool set index, and the second tool set index.

The first tool set index is represented as a first bit string, and the second tool set index is represented as a second bit string. When a value of a $N^{th}$ bit in each of the first bit string and the second bit string is 1, a value of a tool flag corresponding to the $N^{th}$ bit is set to 1. N is a natural number that is less than or equal to a number of bits included in each of the first bit string and the second bit string.

When the value of the $N^{th}$ bit in the first bit string is 0, and the value of the $N^{th}$ bit at the in the second bit string is set to 0.

The image decoding method may further include, when a tool identified as being allowed to decode the bitstream from the first tool set index is unavailable, stopping decoding the bitstream.

The image decoding method may further include obtaining, from the sequence parameter set, information indicating a profile to which the bitstream conforms. When the information indicating the profile has a predetermined value, the value of the first tool set index and the values of the tool flags may be set to 0.

According to another aspect of the disclosure, an image decoding apparatus may include a memory storing instructions; and at least one processor configured to execute the instructions to: receive a bitstream generated as a result of encoding an image sequence; obtain, from a sequence parameter set of the bitstream, a first tool set index indicating a tool allowed to decode the bitstream among a plurality of tools; obtain, from the sequence parameter set, tool flags indicating whether the plurality of tools have been used for the image sequence; based on the tool flags, identify a tool that has been used to encode the image sequence among the plurality of tools; and reconstruct the image sequence based on the identified tool, wherein values of the tool flags are set according to a value of the first tool set index.

According to another aspect of the disclosure, an image encoding method performed by an image encoding apparatus, may include: encoding an image sequence based on at least one tool selected from among a plurality of tools; generating a first tool set index indicating a tool allowed to decode a bitstream, among the plurality of tools; generating tool flags indicating which tools have been used to encode the image sequence, among the plurality of tools; and generating the bitstream including the first tool set index, the tool flags, and a syntax element generated as a result of the encoding, wherein values of the tool flags are set according to a value of the first tool set index.

An image decoding apparatus and method and an image encoding apparatus and method, according to an embodiment, can be applied to various applications only with information about a set of tools without the need to define a plurality of profiles in the standard.

An existing profile is defined as a specific combination of tools, that is, a specific set of tools. However, in an embodiment, a plurality of sets of tools are mapped to a single profile so that various combinations of tools can be supported by the single profile. For example, in regard to a tool available in a particular profile, when it is necessary to define a new profile excluding the tool for reasons of high complexity, a bitstream is configured with a set of tools excluding the tool from the profile, thereby achieving the above technical problem. Recently, as tools that are supported by video codec technology increase in number and become more complex, and various new applications such as virtual reality (VR) or high dynamic range (HDR) are continuously introduced, the demand for configuring a set of tools suitable for these applications is increasing. In an embodiment, the configuration of the set of tools can be processed more efficiently in response to the requirements of various application fields.

It should be noted that effects that can be achieved by the image decoding apparatus and method and the image encoding apparatus and method, according to the embodiment, are not limited to those described above, and other effects not mentioned will be apparent to one of ordinary skill in the art from the following descriptions.

BRIEF DESCRIPTION OF THE DRAWINGS

A brief description of each drawing is provided to better understand the drawings cited herein.

FIG. 4 illustrates a process of determining at least one coding unit by splitting a non-square coding unit, according to an embodiment.

FIG. 13 illustrates a process of determining a depth of a coding unit as a shape and a size of the coding unit change, when the coding unit is recursively split such that a plurality of coding units are determined, according to an embodiment.

FIG. 17 illustrates various shapes of coding units that may be determined based on split shape mode information that is expressed with a binary code, according to an embodiment.

FIG. 18 illustrates other shapes of coding units that may be determined based on split shape mode information that is expressed with a binary code, according to an embodiment.

FIG. 22 is a table illustrating a correspondence relationship between respective bits of a first bit string and a plurality of tools.

FIG. 23 is a diagram for describing that a bitstream is undecodable when a tool required for decoding the bitstream is not usable by an image decoding apparatus, according to an embodiment.

FIG. 24 is a table illustrating a syntax structure of a sequence parameter set.

FIG. 25 is a diagram illustrating values of tool flags restricted according to a value of a first tool set index and a value of a second tool set index.

DETAILED DESCRIPTION

Figure 1:
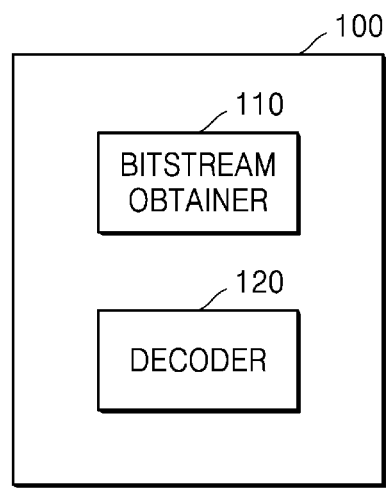
FIG. 1 is a block diagram of an image decoding apparatus according to an embodiment.

As the disclosure allows for various changes and numerous embodiments, specific embodiments will be illustrated in the drawings and described in detail in the written description. However, this is not intended to limit embodiments to particular modes of practice, and it is to be appreciated that the disclosure includes all changes, equivalents, and substitutes that do not depart from the spirit and technical scope of embodiments.

In the description of embodiments, certain detailed explanations of related art are omitted when it is deemed that they may unnecessarily obscure the essence of the disclosure. Also, numbers (e.g., a first, a second, and the like) used in the description of the specification are merely identifier codes for distinguishing one component from another.

Also, in the present specification, it will be understood that when components are "connected" or "coupled" to each other, the components may be directly connected or coupled to each other, but may alternatively be connected or coupled to each other with an intervening component therebetween, unless specified otherwise.

Also, in the present specification regarding a component represented as a "portion (unit)" or a "module," two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

Also, in the present specification, an 'image' or a 'picture' may denote a still image of video, or a moving picture, that is, video itself.

Also, in the present specification, a 'sample' or 'signal' refers to, as data assigned to a sampling location of an image, data to be processed. For example, pixel values on a spatial-domain image and transform coefficients on a transform domain may be samples. A unit including such at least one sample may be defined as a block.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, an image encoding method and apparatus and an image decoding method and apparatus, based on a coding unit and a transform unit of a tree structure according to an embodiment will be disclosed with reference to FIGS. 1 to 19.

FIG. 1 is a block diagram of an image decoding apparatus 100 according to an embodiment.

The image decoding apparatus 100 may include a bitstream obtainer 110 and a decoder 120. The bitstream obtainer 110 and the decoder 120 may include at least one processor. Also, the bitstream obtainer 110 and the decoder 120 may include a memory storing instructions that are executed by the at least one processor.

The bitstream obtainer 110 may receive a bitstream. The bitstream may include information resulting from image encoding by an image encoding apparatus 200 which will be described below. Also, the bitstream may be transmitted from the image encoding apparatus 200. The image decoding apparatus 100 may be connected to the image encoding apparatus 200 in a wired or wireless manner, and the bitstream obtainer 110 may receive a bitstream in a wired or wireless manner. The bitstream obtainer 110 may receive a bitstream from a storage medium, such as optical media, a hard disk, etc. The decoder 120 may reconstruct an image based on information obtained from the received bitstream. The decoder 120 may obtain, from the bitstream, a syntax element for reconstructing the image. The decoder 120 may reconstruct the image based on the syntax element.

The operation of the image decoding apparatus 100 will be described in detail below. The bitstream obtainer 110 may receive a bitstream.

The image decoding apparatus 100 may perform an operation of obtaining a bin string corresponding to a split shape mode of a coding unit from the bitstream. Then, the image decoding apparatus 100 may perform an operation of determining a split rule of a coding unit. Also, the image decoding apparatus 100 may perform an operation of splitting a coding unit into a plurality of coding units, based on at least one of the bin string corresponding to the split shape mode and the split rule. The image decoding apparatus 100 may determine a first range which is an allowable size range of a coding unit, according to a ratio of a height to a width of the coding unit, in order to determine the split rule. The image decoding apparatus 100 may determine a second range which is an allowable size range of a coding unit, according to a split shape mode of the coding unit, in order to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). According to an implementation example, a slice may include one or more tiles, and a slice may include one or more largest coding units. A slice including one or plurality of tiles may be determined in a picture.

There is a largest coding block (coding tree block (CTB)) conceptually compared to a CTU. The CTB denotes an N×N block including N×N samples (where N is an integer). Each color component may be split into one or more largest coding blocks.

When a picture has three sample arrays (sample arrays for Y, Cr, and Cb components), a CTU includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a certain size including a certain number of samples, a largest coding block and a largest coding unit, or a coding block and a coding unit are mentioned in the following specification without being distinguished unless otherwise described.

An image may be split into CTUs. A size of each largest coding unit may be determined based on information obtained from a bitstream. A shape of each largest coding unit may be a square shape of the same size. However, an embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of a plurality of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in more detail with reference to FIGS. 3 to 16.

Also, one or more prediction blocks for prediction may be determined from a coding unit. The prediction block may be the same as or smaller than the coding unit. Also, one or more transform blocks for transformation may be determined from a coding unit. The transform block may be the same as or smaller than the coding unit.

The shapes and sizes of the transform block and prediction block may not be related to each other.

In another embodiment, prediction may be performed by using a coding unit as a prediction block. Also, transformation may be performed by using a coding unit as a transform block.

The splitting of the coding unit will be described in more detail with reference to FIGS. 3 to 16. A current block and an adjacent block of the disclosure may indicate one of the largest coding unit, the coding unit, the prediction block, and the transform block. Also, the current block or the current coding unit is a block that is currently being decoded or encoded or a block that is currently being split. The adjacent block may be a block reconstructed before the current block. The adjacent block may be adjacent to the current block spatially or temporally. The adjacent block may be located at one of the lower left, left, upper left, top, upper right, right, lower right of the current block.

Figure 3:
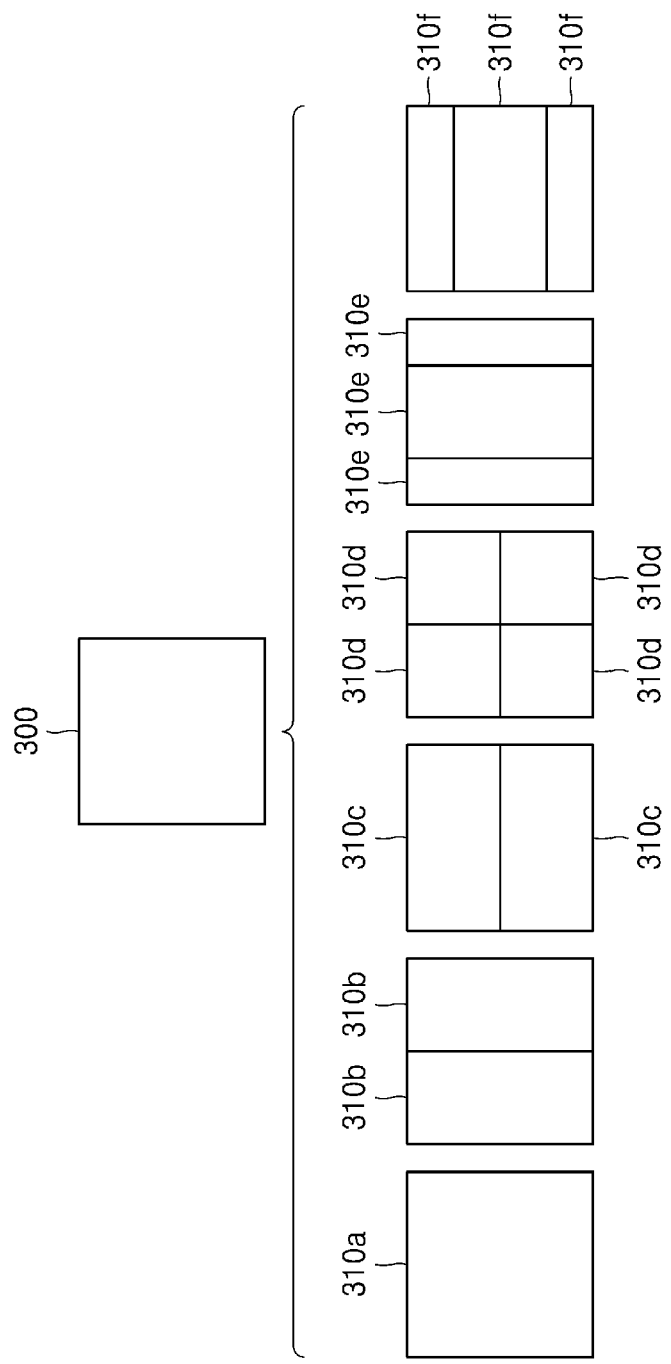
FIG. 3 illustrates a process of determining at least one coding unit by splitting a current coding unit, according to an embodiment.

FIG. 3 illustrates a process in which the image decoding apparatus 100 determines at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, and size of a coding unit.

The shape of the coding unit may include a square and a non-square. When the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square. When the shape of the coding unit is a non-square, the image decoding apparatus 100 may determine the ratio of the width and height among the block shape information of the coding unit as at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, and the area of the coding unit.

According to an embodiment, the image decoding apparatus 100 may determine the shape of the coding unit by using the block shape information, and may determine a splitting method of the coding unit by using split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine the split shape mode information with respect to the largest coding unit to be a quad split. Also, the image decoding apparatus 100 may determine the split shape mode information with respect to the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a certain splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary splitting in a vertical direction. The image decoding apparatus 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Certain splitting methods of splitting the square coding unit will be described in detail below through various embodiments.

FIG. 4 illustrates a process in which the image decoding apparatus 100 determines at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a certain splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420a and 420b, 430a to 430c, 470a and 470b, or 480a to 480c split based on the split shape mode information indicating a certain splitting method. Certain splitting methods of splitting a non-square coding unit will be described in detail below through various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine an odd number of coding units included in the current coding unit 400 or 450, and not all the determined coding units may have the same size. For example, a certain coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a certain restriction on at least one of the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c, or 480a, 480b, and 480c generated as the current coding unit 400 or 450 is split to be different from that of the other coding units 430a and 430c, or 480a and 480c. For example, the image decoding apparatus 100 may restrict the coding unit 430b or 480b at the center location to be no longer split or to be split only a certain number of times, unlike the other coding units 430a and 430c, or 480a and 480c.

Figure 5:
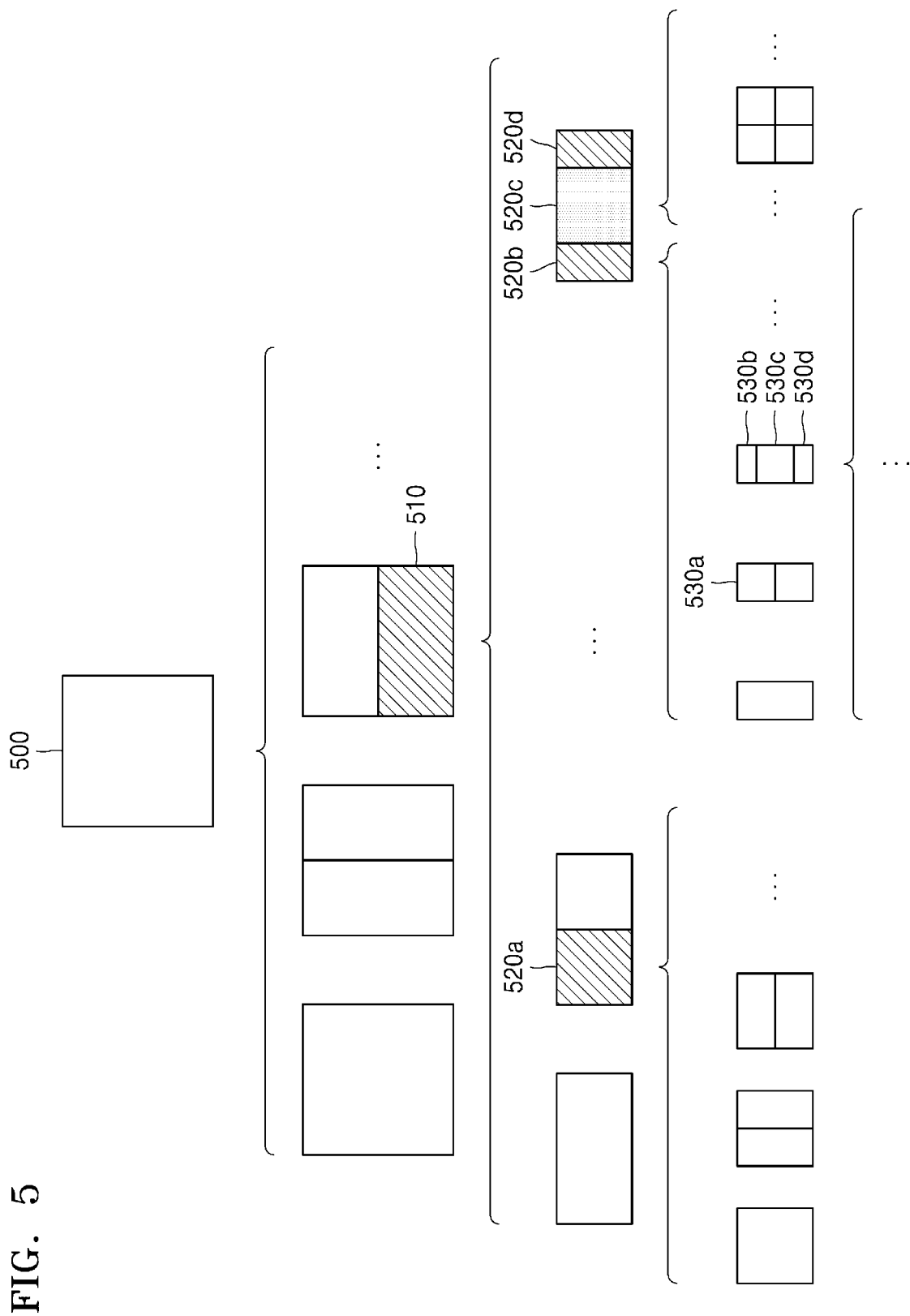
FIG. 5 illustrates a process of splitting a coding unit based on at least one of block shape information and split shape mode information, according to an embodiment.

FIG. 5 illustrates a process in which the image decoding apparatus 100 splits a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520a, 520b, 520c, and 520d based on the split shape mode information. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520a, or 520b, 520c, and 520d) based on the split shape mode information of the second coding unit 510. That is, a coding unit may be recursively split based on the split shape mode information of each coding unit. Accordingly, a square coding unit may be determined by splitting a non-square coding unit, and a non-square coding unit may be determined by recursively splitting the square coding unit.

Referring to FIG. 5, a certain coding unit (e.g., a coding unit located at a center location, or a square coding unit) from among an odd number of third coding units 520b, 520c, and 520d determined by splitting the non-square second coding unit 510 may be recursively split. According to an embodiment, the non-square third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be re-split into a plurality of coding units. For example, the non-square fourth coding unit 530b or 530d may be re-split into an odd number of coding units. A method that may be used to recursively split a coding unit will be described below through various embodiments.

According to an embodiment, the image decoding apparatus 100 may split each of the third coding units 520a, 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a certain restriction on a certain third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a certain location in the current coding unit.

Figure 6:
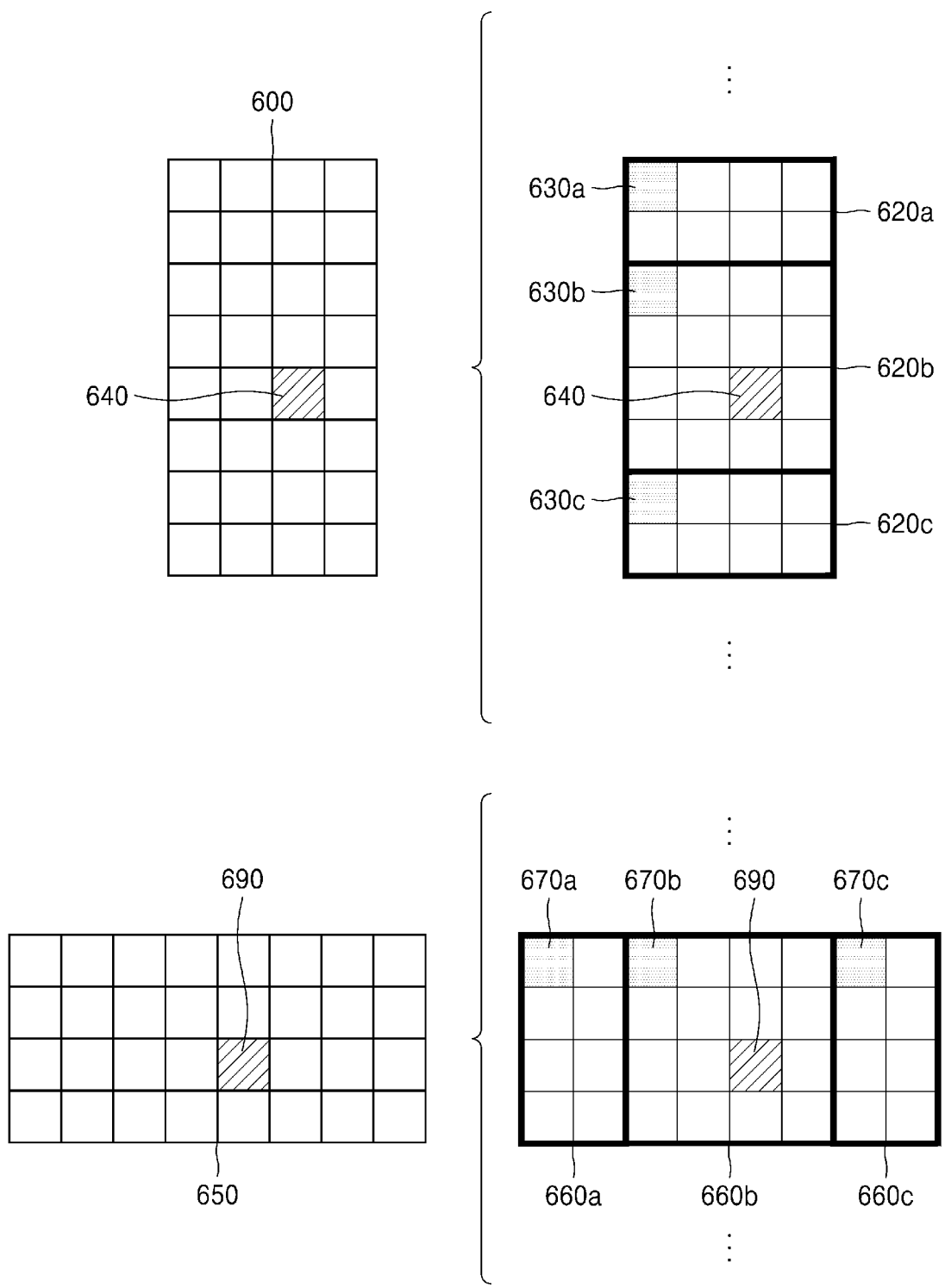
FIG. 6 illustrates a method of determining a certain coding unit from among an odd number of coding units, according to an embodiment.

FIG. 6 illustrates a method in which the image decoding apparatus 100 determines a certain coding unit from among an odd number of coding units, according to an embodiment.

Referring to FIG. 6, split shape mode information of a current coding unit 600 or 650 may be obtained from a sample of a certain location (e.g., a sample 640 or 690 of a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the certain location and may determine to split or not to split the current coding unit into various-shaped and various-sized coding units.

According to an embodiment, when the current coding unit is split into a certain number of coding units, the image decoding apparatus 100 may select one of the coding units. Various methods may be used to select one of a plurality of coding units, as will be described below through various embodiments.

According to an embodiment, the image decoding apparatus 100 may split the current coding unit into a plurality of coding units, and may determine a coding unit at a certain location.

According to an embodiment, the image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of certain samples included in the coding units 620a, 620b, and 620c. In detail, the image decoding apparatus 100 may determine the coding unit 620b at the center location by determining the locations of the coding units 620a, 620b, and 620c based on information indicating locations of upper left samples 630a, 630b, and 630c of the coding units 620a, 620b, and 620c.

According to an embodiment, the information indicating the locations of the upper left samples 630a, 630b, and 630c, which are respectively included in the coding units 620a, 620b, and 620c, may include information about locations or coordinates of the coding units 620a, 620b, and 620c in a picture. According to an embodiment, the information indicating the locations of the upper left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with respect to the location of the upper left sample 630a of the upper coding unit 620a. A method of determining a coding unit at a certain location by using coordinates of a sample included in the coding unit as information indicating a location of the sample is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a certain criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that is the information indicating the location of the upper left sample 630b of the middle coding unit 620b, and the coordinates (xc, yc) that are the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 and the widths or heights of the upper and middle coding units 620a and 620b. The image decoding apparatus 100 may determine a coding unit, which has a size different from that of the others, based on the determined widths and heights of the coding units 620a, 620b, and 620c. Referring to FIG. 6, the image decoding apparatus 100 may determine the middle coding unit 620b, which has a size different from the size of the upper and lower coding units 620a and 620c, as the coding unit of the certain location. However, the above-described process in which the image decoding apparatus 100 determines a coding unit having a size different from the size of the other coding units merely corresponds to an example of determining a coding unit at a certain location by using the sizes of coding units, which are determined based on coordinates of samples, and thus various processes of determining a coding unit at a certain location by comparing the sizes of coding units, which are determined based on coordinates of certain samples, may be used.

The image decoding apparatus 100 may determine the width or height of each of the coding units 660a, 660b, and 660c by using coordinates (xd, yd) that are information indicating a location of an upper left sample 670a of the left coding unit 660a, coordinates (xe, ye) that are information indicating a location of an upper left sample 670b of the middle coding unit 660b, and coordinates (xf, yf) that are information indicating a location of an upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 and the widths or heights of the left and middle coding units 660a and 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the size of the left and right coding units 660a and 660c, as the coding unit of the certain location. However, the above-described process in which the image decoding apparatus 100 determines a coding unit having a size different from the size of the other coding units merely corresponds to an example of determining a coding unit at a certain location by using the sizes of coding units, which are determined based on coordinates of samples, and thus various processes of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a certain location from among an odd number of coding units determined by splitting the current coding unit, by considering the shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of the plurality of coding units at different locations in a horizontal direction and may put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of the plurality of coding units at different locations in a vertical direction and may put a restriction on the coding unit.

According to an embodiment, the image decoding apparatus 100 may use information indicating respective locations of an even number of coding units, to determine the coding unit at the certain location from among the even number of coding units. The image decoding apparatus 100 may determine an even number of coding units by splitting (binary splitting) the current coding unit, and may determine the coding unit at the certain location by using the information about the locations of the even number of coding units. An operation related thereto may correspond to the operation of determining a coding unit at a certain location (e.g., a center location) from among an odd number of coding units, which has been described in detail above with reference to FIG. 6, and thus detailed descriptions thereof will be omitted.

According to an embodiment, when a non-square current coding unit is split into a plurality of coding units, certain information about a coding unit at a certain location may be used in a splitting operation to determine the coding unit at the certain location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620*a*, 620*b*, and 620*c* based on the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various types of information may be used to determine the coding unit at the center location.

According to an embodiment, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the certain location by considering a block shape of the current coding unit 600, may determine the coding unit 620*b* including a sample, from which certain information (e.g., the split shape mode information) may be obtained, from among the plurality of coding units 620*a*, 620*b*, and 620*c* determined by splitting the current coding unit 600, and may put a certain restriction on the coding unit 620*b*. Referring to FIG. 6, according to an embodiment, the image decoding apparatus 100 may determine the sample 640 at the center location of the current coding unit 600 as the sample from which the certain information may be obtained, and may put a certain restriction on the coding unit 620*b* including the sample 640, in a decoding process. However, the location of the sample from which the certain information may be obtained is not limited to the above-described location, and may include arbitrary locations of samples included in the coding unit 620*b* to be determined for a restriction.

According to an embodiment, the location of the sample from which the certain information may be obtained may be determined based on the shape of the current coding unit 600. According to an embodiment, the block shape information may indicate whether the current coding unit has a square or non-square shape, and the location of the sample from which the certain information may be obtained may be determined based on the shape. For example, the image decoding apparatus 100 may determine a sample located at a boundary for splitting at least one of a width and a height of the current coding unit in half, as the sample from which the certain information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the certain information may be obtained.

According to an embodiment, when the current coding unit is split into a plurality of coding units, the image decoding apparatus 100 may use the split shape mode information to determine a coding unit at a certain location from among the plurality of coding units. According to an embodiment, the image decoding apparatus 100 may obtain the split shape mode information from a sample at a certain location in a coding unit, and may split the plurality of coding units, which are generated by splitting the current coding unit, by using the split shape mode information, which is obtained from the sample of the certain location in each of the plurality of coding units. That is, a coding unit may be recursively split based on the split shape mode information, which is obtained from the sample at the certain location in each coding unit. A process of recursively splitting a coding unit has been described above with reference to FIG. 5, and thus detailed descriptions thereof will be omitted.

According to an embodiment, the image decoding apparatus 100 may determine one or more coding units by splitting the current coding unit, and may determine an order of decoding the one or more coding units, based on a certain block (e.g., the current coding unit).

Figure 7:
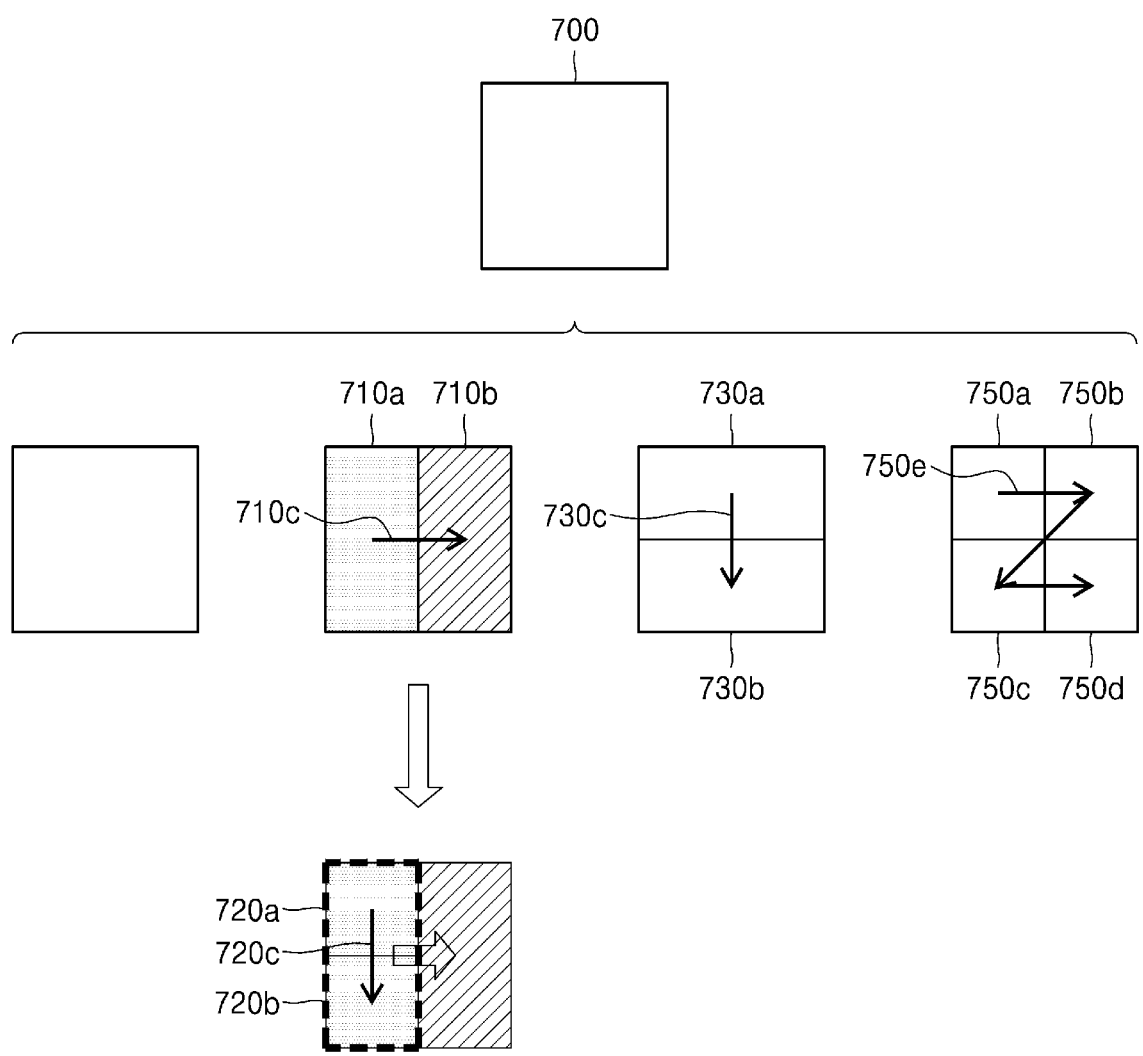
FIG. 7 illustrates an order of processing a plurality of coding units when the plurality of coding units are determined by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine the second coding units 750a, 750b, 750c, and 750d, which are determined by splitting the first coding unit 700 in vertical and horizontal directions, according to a certain order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on a process of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. A process of determining a processing order of coding units based on a coding unit before being split is not limited to the above-described example, and various methods may be used to independently process coding units, which are split and determined to various shapes, in a certain order.

Figure 8:
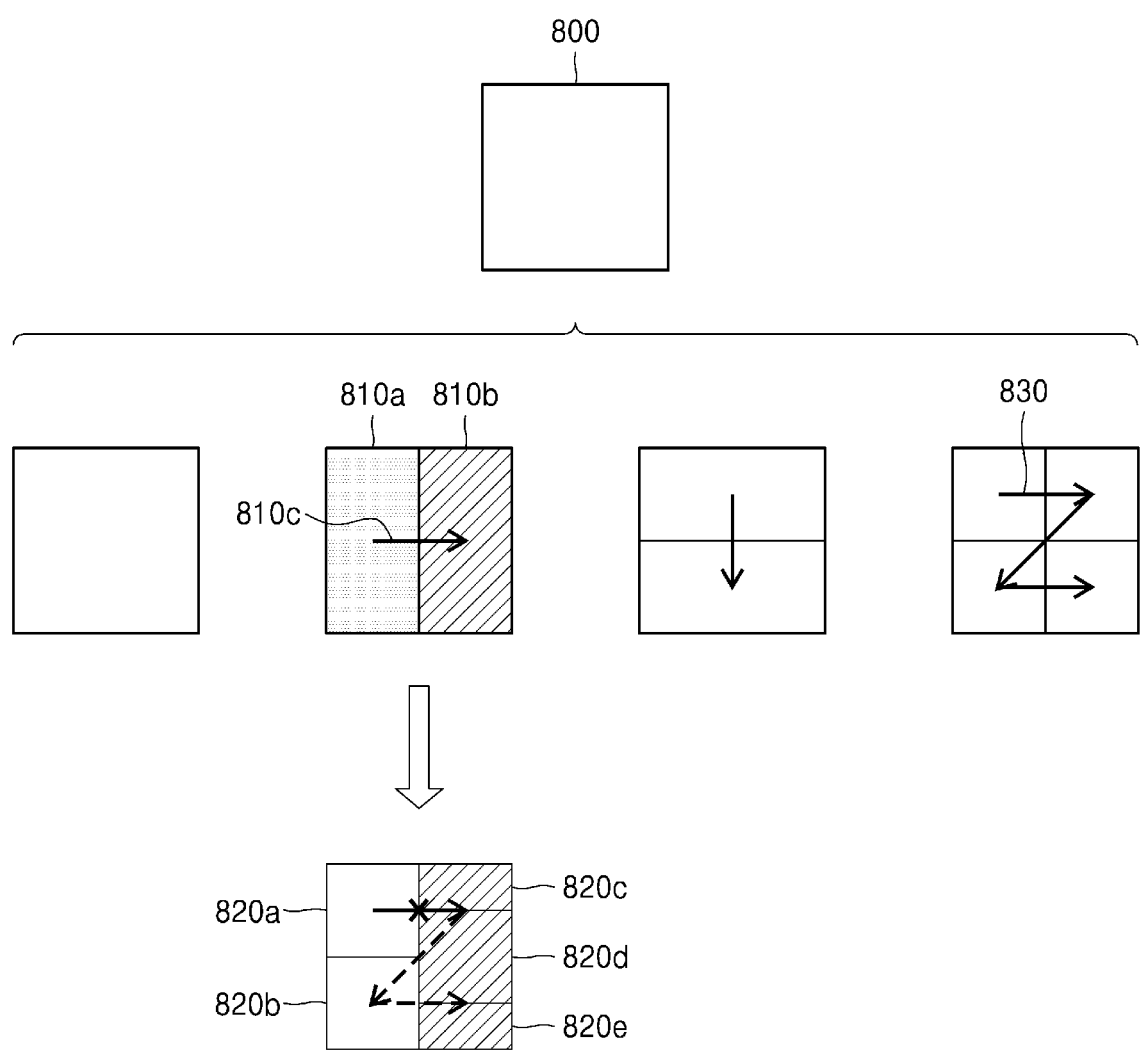
FIG. 8 illustrates a process of determining that a current coding unit is to be split into an odd number of coding units, when the coding units are not processable in a certain order, according to an embodiment.

FIG. 8 illustrates a process in which the image decoding apparatus 100 determines that a current coding unit is to be split into an odd number of coding units, when the coding units are not processable in a certain order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810a and 810b in a vertical direction, and the non-square second coding units 810a and 810b are processed in a horizontal direction order 810c. The second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether any coding unit is split into an odd number of coding units, by determining whether the third coding units 820a and 820b, and 820c, 820d, and 820e are processable in a certain order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e are split into an odd number of coding units, based on at least one of the block shape information and the split shape mode information. For example, a right coding unit from among the second coding units 810a and 810b may be split into an odd number of third coding units 820c, 820d, and 820e. A processing order of a plurality of coding units included in the first coding unit 800 may be a certain order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the certain order.

According to an embodiment, the image decoding apparatus 100 may determine whether the third coding units 820a and 820b, and 820c, 820d, and 820e included in the first coding unit 800 satisfy the condition for processing in the certain order, and the condition relates to whether at least one of a width and a height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may decide disconnection of a scan order, and may determine that the right second coding unit 810b is to be split into an odd number of coding units, based on a result of the decision. According to an embodiment, when a coding unit is split into an odd number of coding units, the image decoding apparatus 100 may put a certain restriction on a coding unit at a certain location from among the split coding units. The restriction or the certain location has been described above through various embodiments, and thus detailed descriptions thereof will be omitted.

Figure 9:
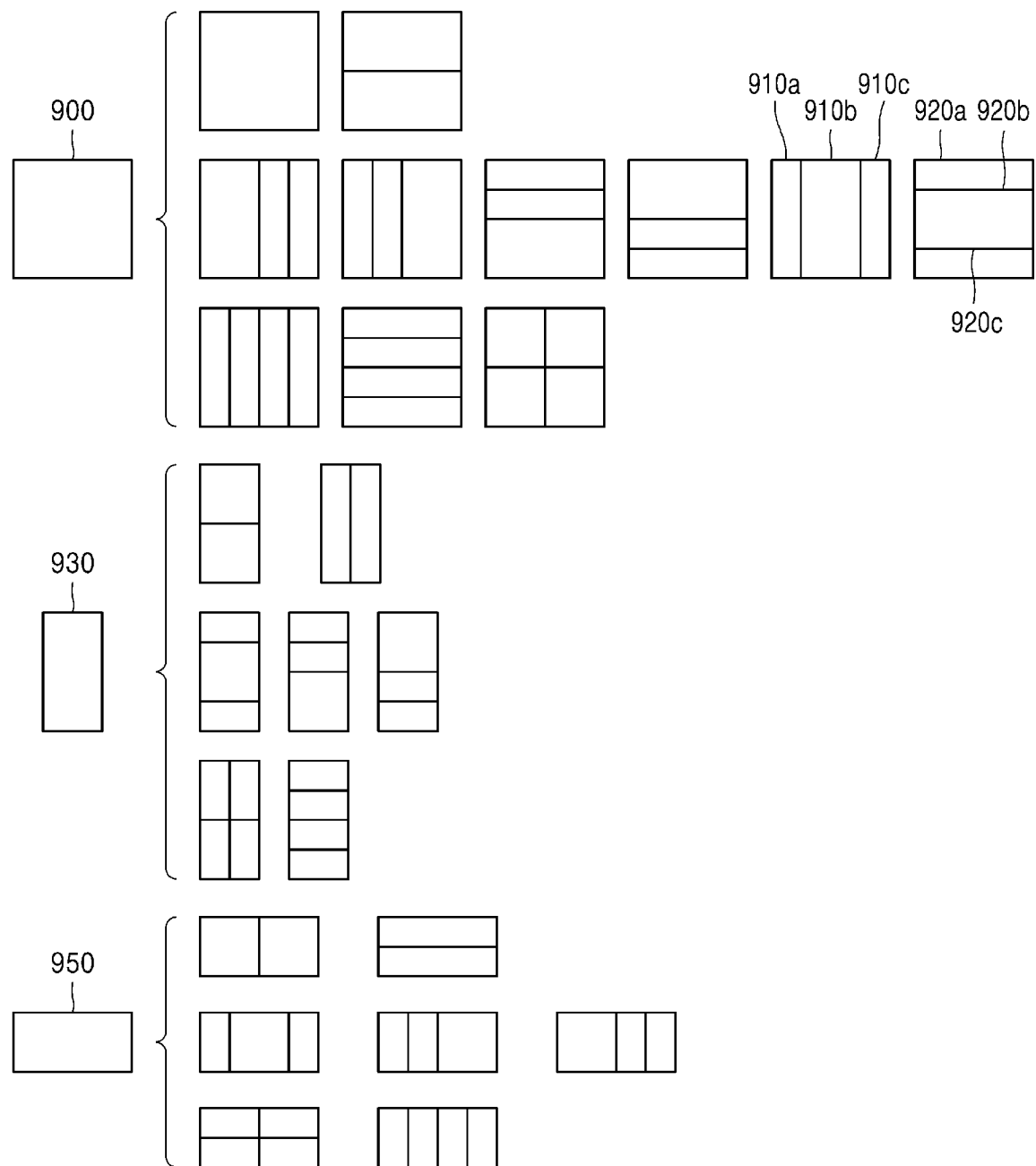
FIG. 9 illustrates a process of determining at least one coding unit by splitting a first coding unit, according to an embodiment.

FIG. 9 illustrates a process in which the image decoding apparatus 100 determines at least one coding unit by splitting a first coding unit 900, according to an embodiment.

According to an embodiment, the image decoding apparatus 100 may split the first coding unit 900, based on split shape mode information, which is obtained by the bitstream obtainer 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a certain order, and the condition relates to whether at least one of a width and a height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the certain order. Also, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the certain order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a certain restriction on a coding unit at a certain location from among the split coding units. The restriction or the certain location has been described above through various embodiments, and thus detailed descriptions thereof will be omitted.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
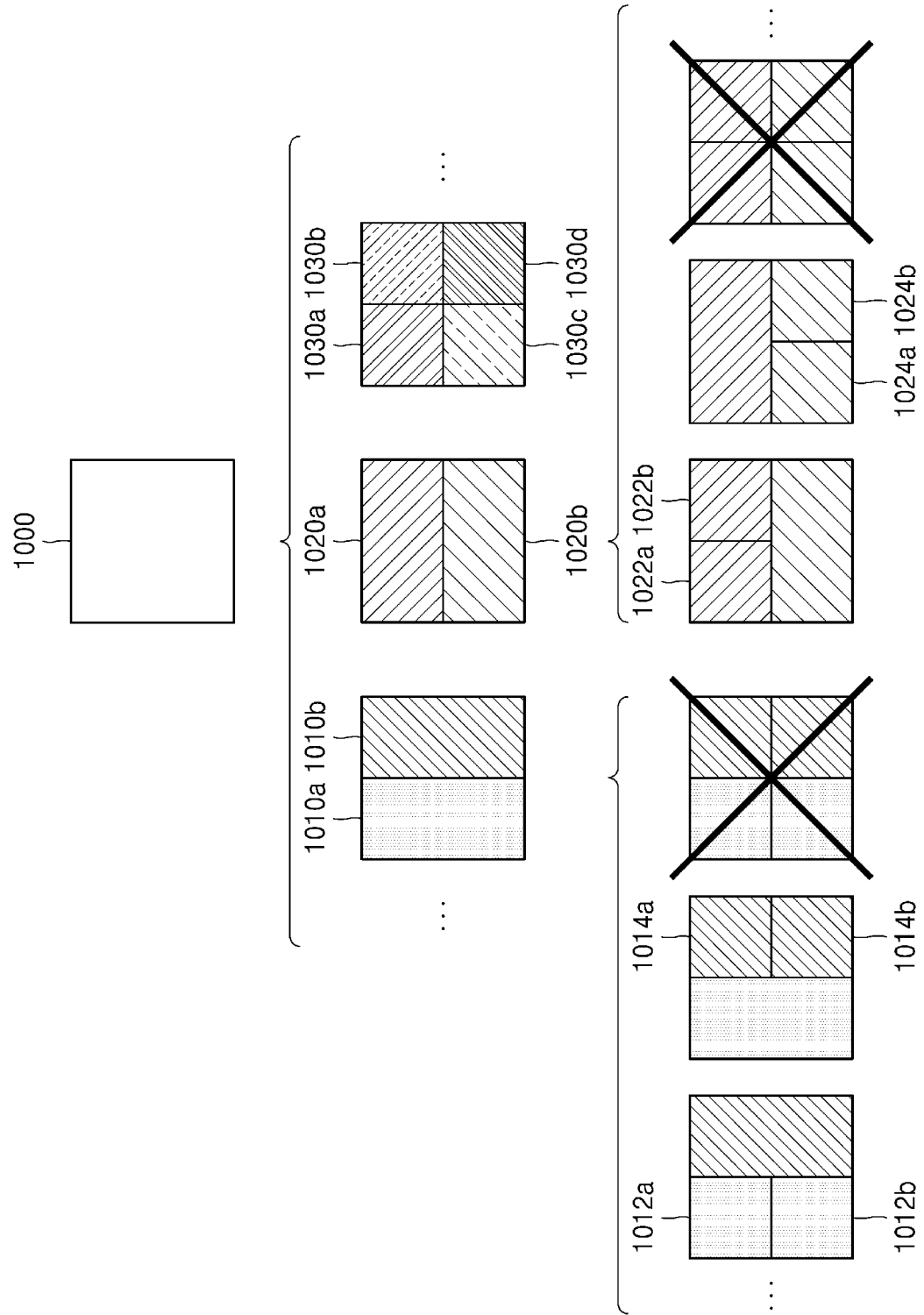
FIG. 10 illustrates that shapes into which second coding units having non-square shapes, determined by splitting a first coding unit, are splittable are restricted when the second coding units satisfy a certain condition, according to an embodiment.

FIG. 10 illustrates that a shape into which a second coding unit is splittable is restricted when the second coding unit having a non-square shape, which is determined when the image decoding apparatus 100 splits a first coding unit 1000, satisfies a certain condition, according to an embodiment.

According to an embodiment, the image decoding apparatus 100 may determine to split the square first coding unit 1000 into non-square second coding units 1010a, and 1010b or 1020a and 1020b, based on split shape mode information, which is obtained by the bitstream obtainer 110. The second coding units 1010a and 1010b, or 1020a and 1020b may be independently split. Accordingly, the image decoding apparatus 100 may determine to split or not to split each of the second coding units 1010a and 1010b, or 1020a and 1020b into a plurality of coding units, based on the split shape mode information of each of the second coding units 1010a and 1010b, or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b not to be split in a horizontal direction in which the left second coding unit 1010a is split. When third coding units 1014a and 1014b are determined by splitting the right second coding unit 1010b in the same direction, because the left and right second coding units 1010a and 1010b are independently split in a horizontal direction, the third coding units 1012a, 1012b, 1014a, and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) not to be split in a vertical direction in which the upper second coding unit 1020a is split.

Figure 11:
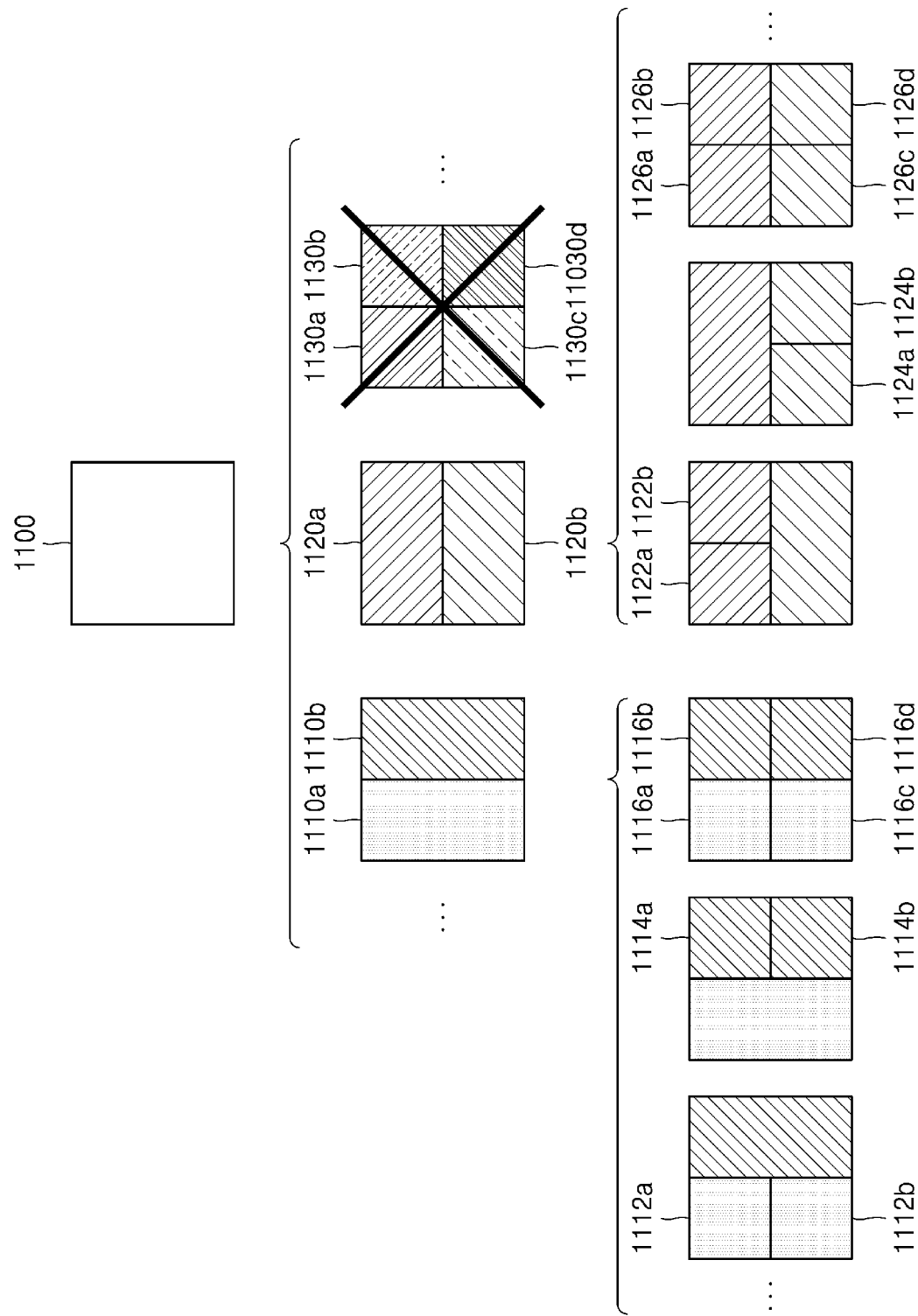
FIG. 11 illustrates a process of splitting a square coding unit when split shape mode information indicates that the square coding unit is not to be split into four square coding units, according to an embodiment.

FIG. 11 illustrates a process in which the image decoding apparatus 100 splits a square coding unit when split shape mode information indicates that the square coding unit is not to be split into four square coding units, according to an embodiment.

According to an embodiment, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b, or 1120a and 1120b, etc., based on the split shape mode information.

According to an embodiment, the image decoding apparatus 100 may independently split the non-square second coding units 1110a and 1110b, or 1120a and 1120b, etc. Each of the second coding units 1110a and 1110b, or 1120a and 1120b, etc. may be recursively split in a certain order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
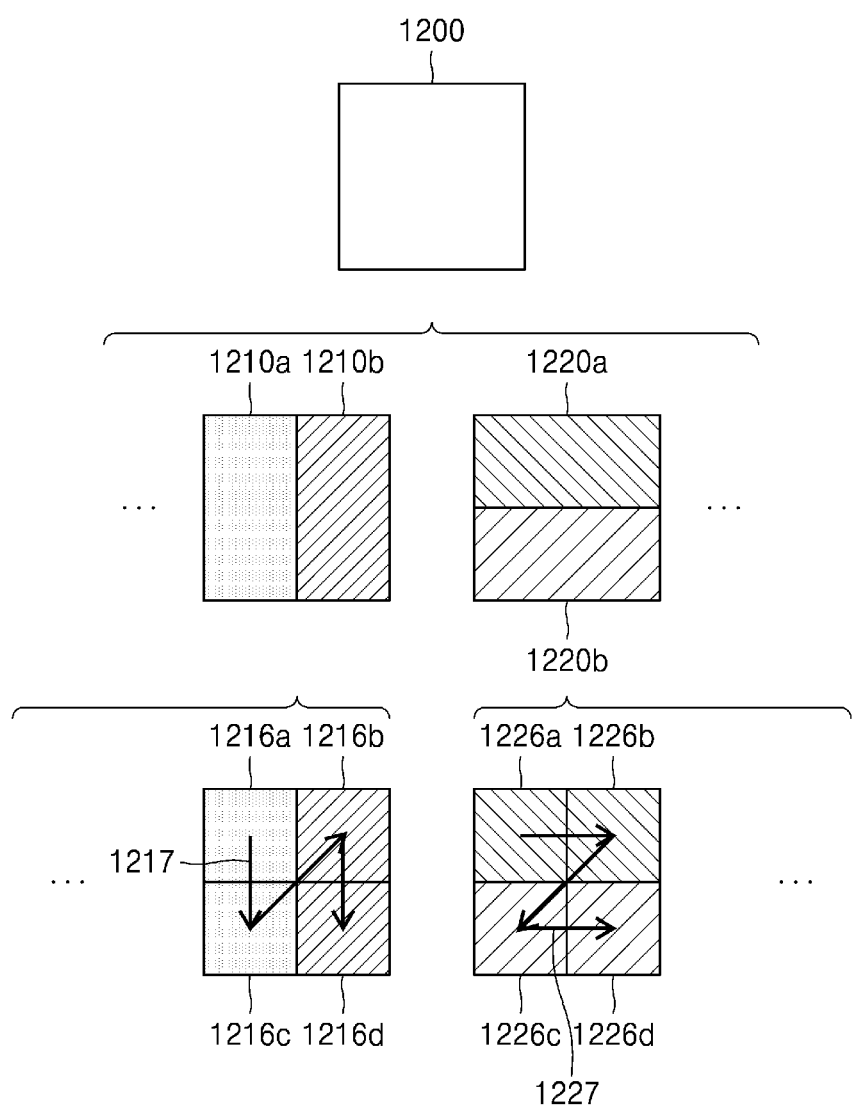
FIG. 12 illustrates that a processing order between a plurality of coding units may be changed depending on a process of splitting a coding unit, according to an embodiment.

FIG. 12 illustrates that a processing order between a plurality of coding units may vary according to a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units (e.g., 1210a and 1210b, or 1220a and 1220b, etc.) by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. A process of splitting the second coding units 1210a and 1210b, or 1220a and 1220b has been described above with reference to FIG. 11, and thus detailed descriptions thereof will be omitted.

According to an embodiment, the image decoding apparatus 100 may process coding units in a certain order. An operation of processing coding units in a certain order has been described above with reference to FIG. 7, and thus detailed descriptions thereof will be omitted. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a split shape into which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to have the same shape.

FIG. 13 illustrates a process of determining a depth of a coding unit as a shape and a size of the coding unit change, when the coding unit is recursively split to determine a plurality of coding units, according to an embodiment.

According to an embodiment, the image decoding apparatus 100 may determine a depth of a coding unit, based on a certain criterion. For example, the certain criterion may be the length of a long side of the coding unit. When the length of a long side of a coding unit before being split is $2n$ times (n>0) the length of a long side of a split current coding unit, the image decoding apparatus 100 may determine that a depth of the current coding unit is increased from a depth of the coding unit before being split, by n. In the following descriptions, a coding unit having an increased depth is represented as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (e.g., the block shape information may be represented as '0: SQUARE'). Assuming that the size of the square first coding unit 1300 is 2N×2N, the second coding unit 1302 determined by splitting a width and a height of the first coding unit 1300 in ½ may have a size of N×N. Furthermore, the third coding unit 1304 determined by splitting a width and a height of the second coding unit 1302 in ½ may have a size of N/2×N/2. In this case, a width and a height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be represented as '1:NS_VER' indicating a non-square shape, a height of which is longer than a width, or as '2:NS_HOR' indicating a non-square shape, a width of which is longer than a height).

The image decoding apparatus 100 may determine the second coding unit 1302, 1312, or 1322 by splitting at least one of a width and a height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine a second coding unit (e.g., 1302, 1312, or 1322) by splitting at least one of a width and a height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit (e.g., 1304, 1314, or 1324) by splitting at least one of a width and a height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine a third coding unit (e.g., 1304, 1314, or 1324) by splitting at least one of a width and a height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine a third coding unit (e.g., 1304, 1314, or 1324) by splitting at least one of a width and a height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split a square coding unit (e.g., 1300, 1302, or 1304) in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of a longest side of a coding unit, a depth of a coding unit determined by splitting the first coding unit 1300 having a size of 2N×2N in a horizontal or vertical direction may be the same as the depth of the first coding unit 1300.

According to an embodiment, a width and a height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
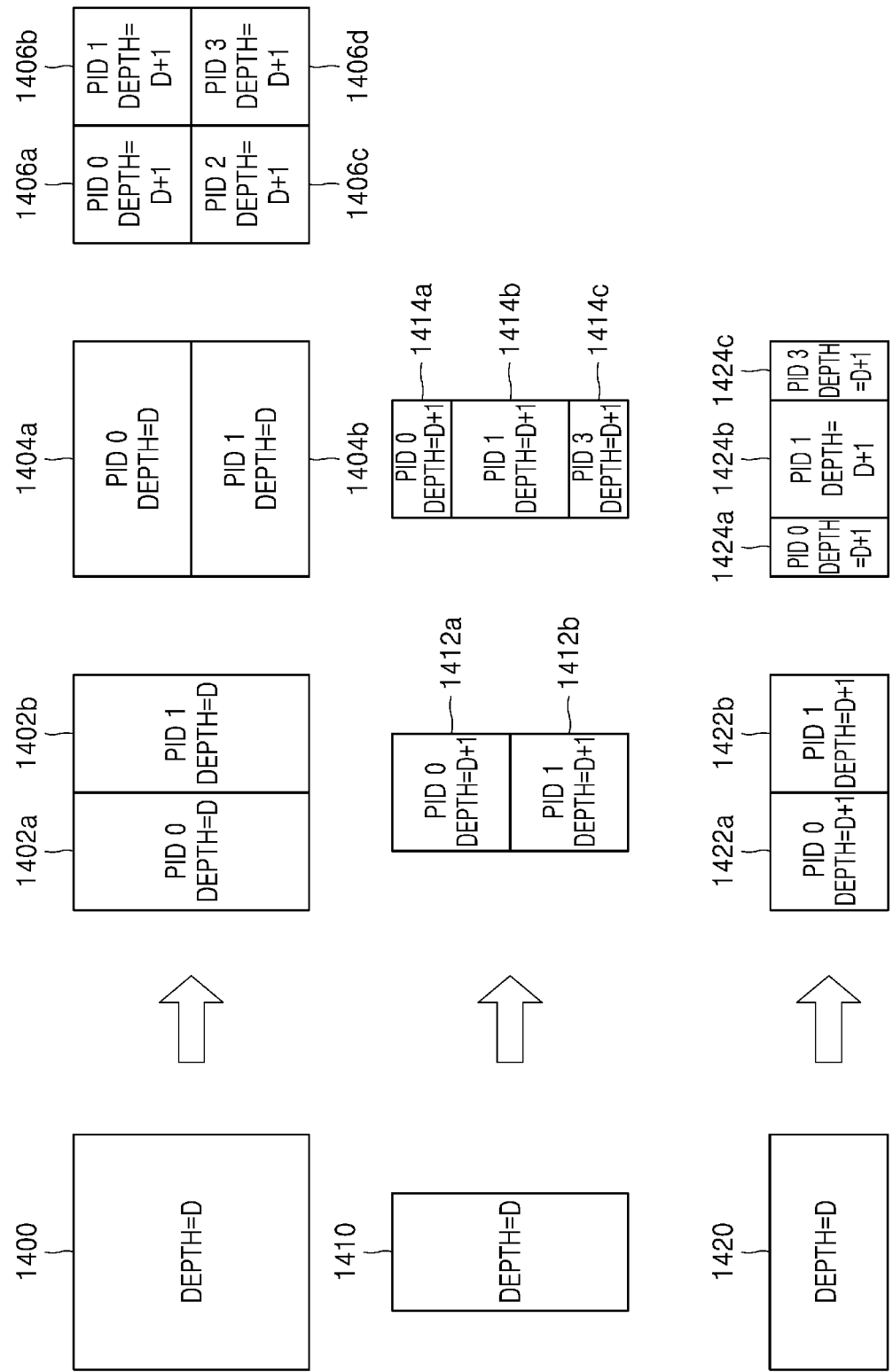
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a,

1406*b*, 1406*c*, and 1406*d*, based on the split shape mode information of the first coding unit 1400.

According to an embodiment, depths of the second coding units 1402*a* and 1402*b*, 1404*a* and 1404*b*, and 1406*a*, 1406*b*, 1406*c*, and 1406*d* that are determined based on the split shape mode information of the square first coding unit 1400 may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 1400 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding apparatus 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an embodiment, the image decoding apparatus 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an embodiment, a depth of the second coding units 1412*a* and 1412*b*, and 1414*a*, 1414*b*, and 1414*c*, or 1422*a* and 1422*b*, and 1424*a*, 1424*b*, and 1424*c*, which are determined based on the split shape mode information of the non-square first coding unit 1410 or 1420, may be determined based on the length of a long side thereof. For example, because the length of a side of the square second coding units 1412*a* and 1412*b* is ½ times the length of a long side of the first coding unit 1410 having a non-square shape, a height of which is longer than a width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have the same size. Referring to FIG. 14, the coding unit 1414*b* of a center location among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Accordingly, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have the same size, based on whether discontinuity is present in PI Ds for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a certain location of each coding unit (e.g., an upper left sample).

According to an embodiment, the image decoding apparatus 100 may determine a coding unit at a certain location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PI Ds of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have the same size. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a certain location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the certain location to be determined are not limited to the above-described examples, and various PIDs and various locations and sizes of coding units may be used.

According to an embodiment, the image decoding apparatus 100 may use a certain data unit where a coding unit starts to be recursively split.

Figure 15:
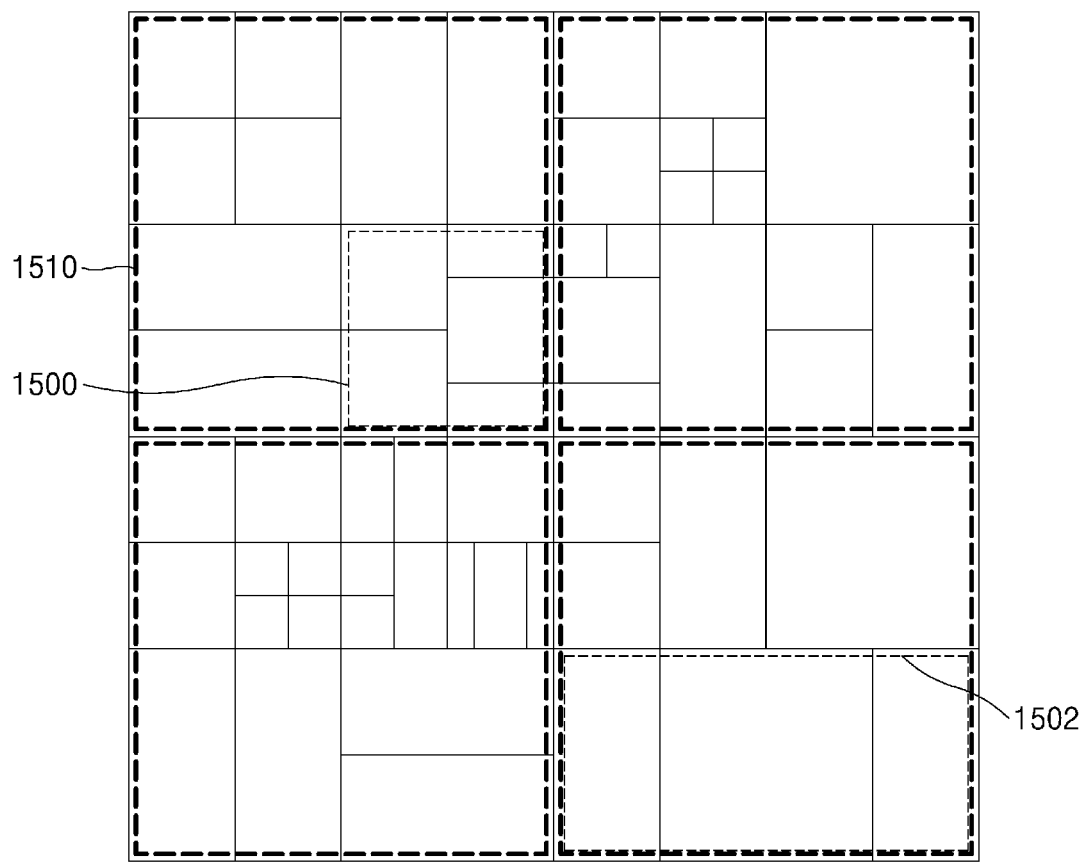
FIG. 15 illustrates that a plurality of coding units are determined based on a plurality of certain data units included in a picture, according to an embodiment.

FIG. 15 illustrates that a plurality of coding units are determined based on a plurality of certain data units included in a picture, according to an embodiment.

According to an embodiment, a certain data unit may be defined as a data unit where a coding unit starts to be recursively split by using split shape mode information. That is, the certain data unit may correspond to a coding unit of an uppermost depth, which is used to determine a plurality of coding units split from a current picture. In the following descriptions, for convenience of explanation, the certain data unit is referred to as a reference data unit.

According to an embodiment, the reference data unit may have a certain size and a certain shape. According to an embodiment, a reference coding unit may include M×N samples. Herein, M and N may be equal to each other, and may be integers represented as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The process of splitting the reference data unit may correspond to a splitting process using a quadtree structure.

According to an embodiment, the image decoding apparatus 100 may pre-determine a minimum size allowed for the reference data units included in the current picture. Accordingly, the image decoding apparatus 100 may determine reference data units having various sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the bitstream obtainer 110 of the image decoding apparatus 100 may obtain, from a bitstream, at least one of reference coding unit shape information and reference coding unit size information for each of the various data units. A process of splitting the square reference coding unit 1500 into one or more coding units has been described above in relation to the process of splitting the current coding unit 300 of FIG. 3, and a process of splitting the non-square reference coding unit 1502 into one or more coding units has been described above in relation to the process of splitting the current coding unit 400 or 450 of FIG. 4, and thus detailed descriptions thereof will be omitted.

According to an embodiment, the image decoding apparatus 100 may use a PID for identifying the size and shape of reference coding units, to determine the size and shape of reference coding units according to some data units pre-determined based on a certain condition. That is, the bitstream obtainer 110 may obtain, from the bitstream, only the PID for identifying the size and shape of reference coding units with respect to each slice, slice segment, tile, tile group, or largest coding unit which is a data unit satisfying a certain condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units for each data unit, which satisfies the certain condition, by using the PID. When the reference coding unit shape information and the reference coding unit size information are obtained and used from the bitstream according to each data unit having a relatively small size, the efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be pre-determined. That is, the image decoding apparatus 100 may determine at least one of the size and shape of reference coding units included in a data unit serving as a unit for obtaining the PID, by selecting the pre-determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and a height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit or each reference coding unit, and may use the obtained syntax element.

Hereinafter, a method of determining a split rule according to an embodiment of the disclosure will be described in detail.

The image decoding apparatus 100 may determine a split rule of an image. The split rule may be pre-determined between the image decoding apparatus 100 and the image encoding apparatus 200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, a shape, a ratio of width and height, and a direction of the coding unit. The image encoding apparatus 200 and the image decoding apparatus 100 may pre-determine to determine the split rule based on the block shape of the coding unit. However, an embodiment is not limited thereto. The image decoding apparatus 100 may determine the split rule based on the information obtained from the bitstream received from the image encoding apparatus 200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, . . . , and 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, the direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule so that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders have been described above with reference to FIG. 12, detailed descriptions thereof will be omitted.

Figure 16:
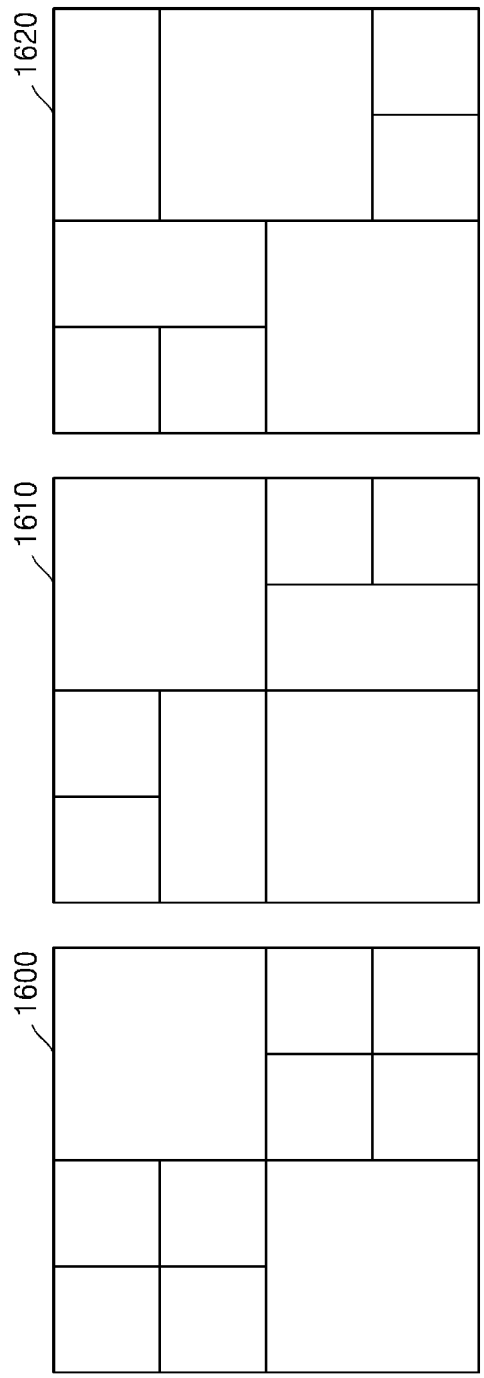
FIG. 16 illustrates coding units of individual pictures, when the individual pictures have different split shape combinations of coding units, according to an embodiment.

FIG. 16 illustrates coding units which may be determined for each picture, when a combination of shapes into which a coding unit may be split is different for each picture, according to an embodiment.

Referring to FIG. 16, the image decoding apparatus 100 may, for each picture, differently determine a combination of split shapes into which a coding unit may be split. For example, the image decoding apparatus 100 may decode an image by using a picture 1600 which may be split into four coding units, a picture 1610 which may be split into two or four coding units, and a picture 1620 which may be split into two, three, or four coding units, from among one or more pictures included in the image.

In order to split the picture 1600 into a plurality of coding units, the image decoding apparatus 100 may use only split shape information indicating to split into four square coding units. In order to split the picture 1610, the image decoding apparatus 100 may use only split shape information indicating to split into two or four coding units. In order to split the picture 1620, the image decoding apparatus 100 may use only split shape information indicating to split into two, three, or four coding units. The combinations of the split shapes described above are only an embodiment for describing an operation of the image decoding apparatus 100. Thus, the combinations of the split shapes described above should not be interpreted to be limited to the embodiment described above, and should be interpreted so that various types of combinations of the split shapes may be used for a certain data unit.

According to an embodiment, the bitstream obtainer 110 of the image decoding apparatus 100 may obtain a bitstream including an index indicating a combination of split shape information for each certain data unit (e.g., a sequence, a picture, a slice, a slice segment, a tile, or a tile group). For example, the bitstream obtainer 110 may obtain the index indicating the combination of the split shape information from a sequence parameter set, a picture parameter set, a slice header, a tile header, or a tile group header. The bitstream obtainer 110 of the image decoding apparatus 100 may determine, for each certain data unit, a combination of split shapes into which a coding unit may be split by using the obtained index, and thus, for each certain data unit, a different combination of the split shapes may be used.

FIG. 17 illustrates various shapes of a coding unit, which may be determined based on split shape mode information that may be represented as a binary code, according to an embodiment.

According to an embodiment, the image decoding apparatus 100 may split a coding unit into various shapes by using block shape information and split shape mode information obtained by the bitstream obtainer 110. Shapes into which coding units may be split may be various shapes including shapes described above through the embodiments.

Referring to FIG. 17, the image decoding apparatus 100 may split a coding unit having a square shape in at least one of a horizontal direction and a vertical direction, and a coding unit having a non-square shape in the horizontal direction or the vertical direction, based on split shape mode information.

According to an embodiment, when the image decoding apparatus 100 may split a coding unit having a square shape in the horizontal direction and the vertical direction to determine four square coding units, split shape mode information for a square coding unit may represent four split shapes. According to an embodiment, the split shape mode information may be represented as a two-digit binary code, and a binary code may be allocated to each split shape. For example, when a coding unit is not split, split shape mode information may be represented as (00)b, when a coding unit is split in the horizontal direction and the vertical direction, split shape mode information may be represented as (01)b, when a coding unit is split in the horizontal direction, split shape mode information may be represented as (10)b, and when a coding unit is split in the vertical direction, split shape mode information may be represented as (11)b.

According to an embodiment, when the image decoding apparatus 100 splits a coding unit having a non-square shape in the horizontal direction or the vertical direction, types of split shapes that may be represented by split shape mode information may depend on the number of coding units into which the coding unit is to be split. Referring to FIG. 17, the image decoding apparatus 100 may split a coding unit having a non-square shape into up to three coding units, according to an embodiment. Also, the image decoding apparatus 100 may split a coding unit into two coding units. In this case, split shape mode information may be represented as (10)b. The image decoding apparatus 100 may split a coding unit into three coding units. In this case, split shape mode information may be represented as (11)b. The image decoding apparatus 100 may determine not to split a coding unit. In this case, split shape mode information may be represented as (0)b. That is, the image decoding apparatus 100 may use variable length coding (VLC), instead of fixed length coding (FLC), in order to use a binary code representing split shape mode information.

According to an embodiment, referring to FIG. 17, a binary code of split shape mode information representing that a coding unit is not split may be represented as (0)b. When the binary code of the split shape mode information indicating not to split the coding unit is configured as (00)b, all of 2-bit binary codes of the split shape mode information may have to be used, even though there is no split shape mode information configured as (01)b. However, as shown in FIG. 17, when three split shapes are used for a coding unit having a non-square shape, the image decoding apparatus 100 may determine that a coding unit is not split by using a binary code (0)b of 1 bit as split shape mode information, thereby efficiently using a bitstream. However, split shapes of a coding unit having a non-square shape, which are represented by split shape mode information, should not be interpreted to be limited to three shapes shown in FIG. 17, and should be interpreted to be various shapes including the above-described embodiments.

Figure 18:
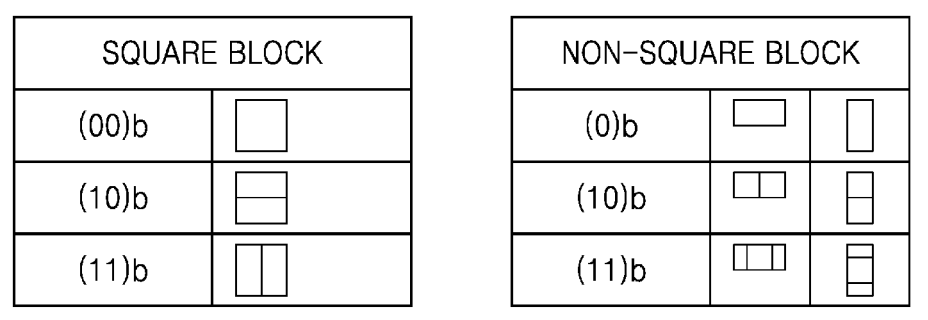

FIG. 18 illustrates other shapes of coding units, which may be determined based on split shape mode information that may be represented as a binary code, according to an embodiment.

Referring to FIG. 18, the image decoding apparatus 100 may split a square coding unit in a horizontal direction or a vertical direction and may split a non-square coding unit in the horizontal direction or the vertical direction, based on the split shape mode information. That is, the split shape mode information may indicate to split the square coding unit in one direction. In this case, a binary code of the split shape mode information indicating not to split the square coding unit may be represented as (0)b. When the binary code of the split shape mode information indicating not to split the coding unit is configured as (00)b, all of 2-bit binary codes of the split shape mode information may have to be used, even though there is no split shape mode information configured as (01)b. However, when, as illustrated in FIG. 18, three split shape shapes with respect to the square coding unit are used, the image decoding apparatus 100 may determine not to split the coding unit, even by using a 1-bit binary code (0)b as the split shape mode information. Thus, a bitstream may be efficiently used. However, the split shapes of the square coding unit indicated by the split shape mode information should not be interpreted as being limited to the three split shapes illustrated in FIG. 18 and should be interpreted to include various shapes including the embodiments described above.

According to an embodiment, the block shape information or the split shape mode information may be represented by using a binary code, and the block shape information or the split shape mode information may be directly generated as a bitstream. Also, the block shape information or the split shape mode information which may be represented as a binary code may not be directly generated as a bitstream and may be used as a binary code which is input in context adaptive binary arithmetic coding (CABAC).

According to an embodiment, a process in which the image decoding apparatus 100 obtains syntax for the block shape information or the split shape mode information through the CABAC is described. A bitstream including a binary code with respect to the syntax may be obtained by the bitstream obtainer 110. The image decoding apparatus 100 may detect a syntax element indicating the block shape information or the split shape mode information by inverse binarizing a bin string included in the obtained bitstream. According to an embodiment, the image decoding apparatus 100 may obtain a set of binary bin strings corresponding to a syntax element to be decoded and may decode each bin by using probability information. Also, the image decoding apparatus 100 may repeat this process until a bin string composed of these decoded bins becomes the same as one of previously obtained bin strings. The image decoding apparatus 100 may determine the syntax element by performing inverse binarization on the bin string.

According to an embodiment, the image decoding apparatus 100 may determine the syntax for the bin string by performing a decoding process of adaptive binary arithmetic coding, and the image decoding apparatus 100 may update a probability model with respect to the bins obtained by the bitstream obtainer 110. Referring to FIG. 17, the bitstream obtainer 110 of the image decoding apparatus 100 may obtain a bitstream indicating a binary code representing split shape mode information, according to an embodiment. The image decoding apparatus 100 may determine the syntax for the split shape mode information by using the obtained 1-bit or 2-bit-sized binary code. In order to determine the syntax for the split shape mode information, the image decoding apparatus 100 may update a probability with respect to each bit of the 2-bit binary code. That is, according to whether a value of a first bin of the 2-bit binary code is 0 or 1, the image decoding apparatus 100 may update a probability that a next bin is to have the value of 0 or 1 when the next bin is decoded.

According to an embodiment, in the process of determining the syntax, the image decoding apparatus 100 may update the probability with respect to the bins, in a process of decoding the bins of the bin string with respect to the syntax, and with respect to a specific bit from among the bin string, the image decoding apparatus 100 may not update the probability and may determine that the probability is the same.

Referring to FIG. 17, in a process of determining the syntax by using the bin string representing the split shape mode information about the non-square coding unit, the image decoding apparatus 100 may determine the syntax for the split shape mode information by using one bin having a value of 0, when the non-square coding unit is not split. That is, when the block shape information indicates that a current coding unit has a non-square shape, a first bin of the bin string with respect to the split shape mode information may be 0, when the non-square coding unit is not split, and may be 1, when the non-square coding unit is split into two or three coding units. Accordingly, the probability that the first bin of the bin string of the split shape mode information about the non-square coding unit is 0 may be ⅓, and the probability that the first bin of the bin string of the split shape mode information about the non-square coding unit is 1 may be ⅔. As described above, because the split shape mode information indicating that the non-square coding unit is not split may be represented by using only a 1-bit bin string having the value of 0, the image decoding apparatus 100 may determine the syntax for the split shape mode information by determining whether a second bin is 0 or 1, only when the first bin of the split shape mode information is 1. According to an embodiment, when the first bin with respect to the split shape mode information is 1, the image decoding apparatus 100 may regard that the probability that the second bin is 0 and the probability that the second bin is 1 are the same as each other and may decode the bin.

According to an embodiment, in the process of determining the bins of the bin string with respect to the split shape mode information, the image decoding apparatus 100 may use various probabilities with respect to each bin. According to an embodiment, the image decoding apparatus 100 may differently determine the probabilities of the bins with respect to the split shape mode information, according to a direction of a non-square block. According to an embodiment, the image decoding apparatus 100 may differently determine the probabilities of the bins with respect to the split shape mode information, according to an area or a length of a long side of a current coding unit. According to an embodiment, the image decoding apparatus 100 may differently determine the probabilities of the bins with respect to the split shape mode information, according to at least one of a shape and a length of a long side of a current coding unit.

According to an embodiment, the image decoding apparatus 100 may determine that the probabilities of the bins with respect to the split shape mode information are the same for coding units having a size that is equal to or greater than a certain size. For example, the image decoding apparatus 100 may determine that the probabilities of the bins with respect to the split shape mode information are the same as each other with respect to the coding units having a size that is equal to or greater than 64 samples based on a length of a long side of the coding unit.

According to an embodiment, the image decoding apparatus 100 may determine initial probabilities of the bins composed in the bin string of the split shape mode information based on a slice type (e.g., an I-slice, a P-slice, or a B-slice).

Figure 19:
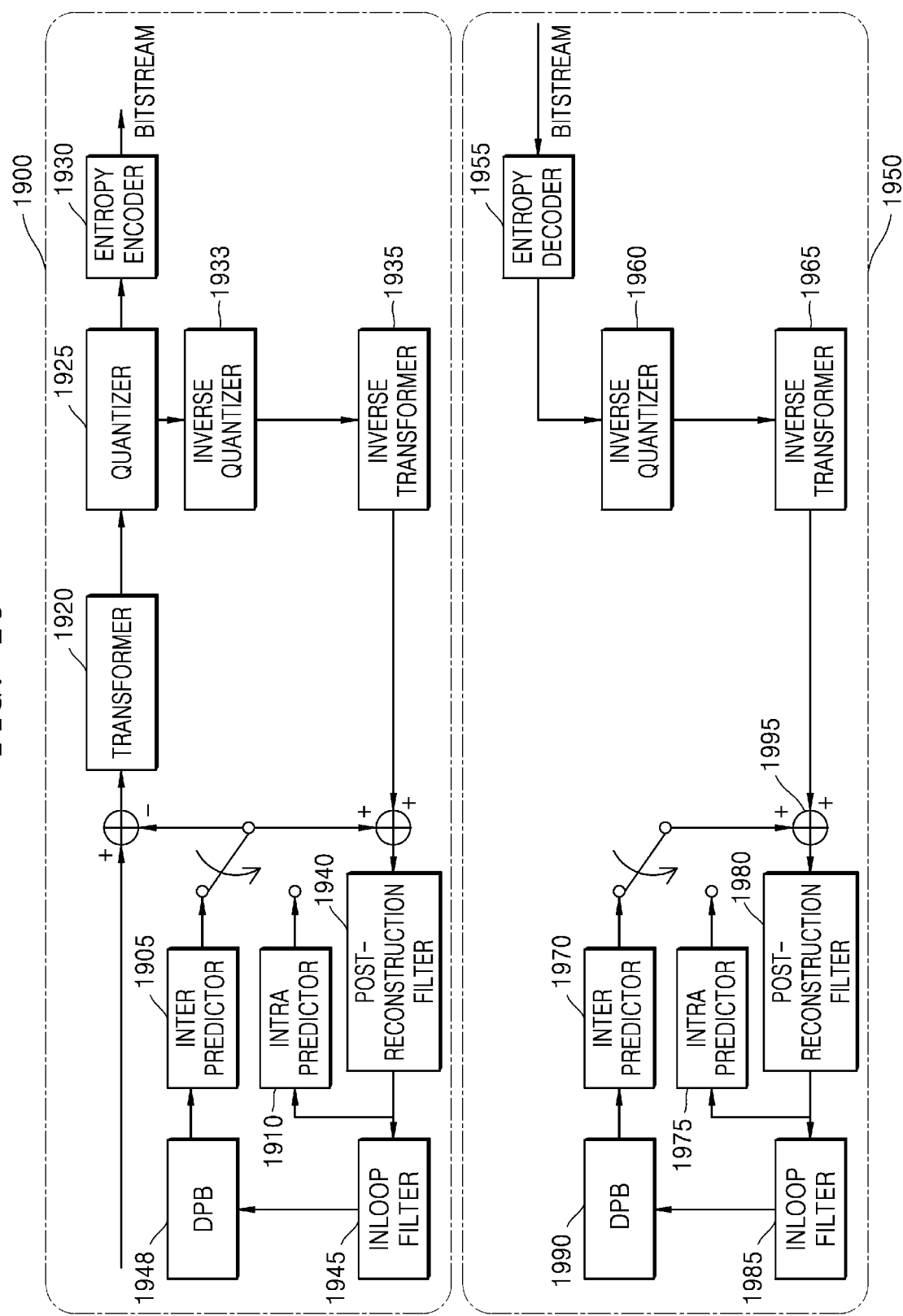
FIG. 19 is a block diagram of an image encoding and decoding system.

FIG. 19 is a block diagram of an image encoding and decoding system.

An encoding device 1900 of an image encoding and decoding system transmits an encoded bitstream of an image, and a decoding device 1950 outputs a reconstructed image by receiving and decoding the bitstream. In this case, the decoding device 1950 may have a configuration similar to that of the image decoding apparatus 100.

In the encoding device 1900, an inter predictor 1905 generates motion information of a current block indicating a reference block of a reference picture temporally adjacent to a current picture when a prediction mode of the current block is an inter prediction mode. The inter predictor 1905 may determine prediction samples of the current block by using samples of reference blocks. The intra predictor 1910 may determine intra prediction information indicating a direction in which neighboring samples similar to the current block are located or a method of determining prediction samples, to determine prediction samples of the current block by using neighboring samples spatially adjacent to the current block.

The inter predictor 1905 may determine reference samples to be used to predict the current block from among previously reconstructed samples stored in a decoded picture buffer (DPB) 1948.

A transformer 1920 may output transform coefficients by performing transform on residual sample values obtained by subtracting prediction samples generated by the inter predictor 1905 or the intra predictor 1910 from an original sample of the current block. A quantizer 1925 quantizes the transform coefficients output from the transformer 1920 and outputs the quantized transform coefficients. An entropy encoder 1930 may encode the quantized transform coefficients into residual syntax elements including a level value and output the residual syntax elements in the form a bitstream.

The quantized transform coefficients output from the quantizer 1925 may be inverse quantized and inverse transformed through an inverse quantizer 1933 and an inverse transformer 1935 to generate residual sample values again.

An adder may add up the residual sample values and prediction sample values and output a reconstructed sample value. A post-reconstruction filter 1940 performs post-reconstruction filtering on the reconstructed samples, and reconstructed sample values updated through post-reconstruction filtering may be used as reference sample values for intra prediction to be performed by the intra predictor 1910. The post-reconstruction filter 1940 may perform Hadamard transform domain filtering or bilateral filtering on the reconstructed sample values.

An in-loop filter 1945 may perform at least one of deblocking filtering or adaptive loop filtering on the reconstructed samples updated through post-reconstruction filtering. The reconstructed sample values updated through filtering by the in-loop filter 1945 may be stored in the DPB 1948 and may be used as reference sample values for inter prediction to be performed by the inter predictor 1905.

An entropy decoder 1955 of the decoding device 1950 may parse residual syntax elements including a level value by performing entropy decoding on the received bitstream. The quantized transform coefficients may be reconstructed from the residual syntax elements. An inverse quantizer 1960 may output transform coefficients by performing inverse quantization on the quantized transform coefficients, and an inverse transformer 1965 may output residual sample values by performing inverse transform on the transform coefficients.

An inter predictor 1970 of the decoding device 1950 may determine a reference picture temporally adjacent to the current picture by using motion information of the current block parsed by the entropy decoder 1955, and may determine a reference block in the reference picture. The inter predictor 1970 may determine prediction samples of the current block by using samples of reference blocks. An intra predictor 1975 of the decoding device 1950 may determine reference samples spatially adjacent to the current block by using intra prediction information by using the motion information of the current block parsed by the entropy decoder 1955, and may determine prediction samples of the current block by using determined neighboring samples.

The inter predictor 1970 may determine reference samples to be used to predict the current block from among previously reconstructed samples stored in a DPB 1990.

An adder 1995 of the decoding device 1950 may add up the residual sample values and prediction sample values and output a reconstructed sample value of the current block. A post-reconstruction filter 1980 of the decoding device 1950 may perform Hadamard transform domain filtering or bilateral filtering on reconstructed sample values. The reconstructed sample values updated through filtering by the post-reconstruction filter 1980 may be used as reference sample values for intra prediction to be performed by the intra predictor 1975.

An in-loop filter 1985 of the decoding device 1950 may perform at least one of deblocking filtering and adaptive loop filtering by using the reconstructed samples updated through post-reconstruction filtering. The reconstructed sample values updated through filtering by the in-loop filter 1985 may be stored in the DPB 1990 and may be used as reference sample values for inter prediction to be performed by the inter predictor 1970.

Various embodiments described above describe an operation related to an image decoding method performed by the image decoding apparatus 100. Hereinafter, an operation of the image encoding apparatus 200 for performing an image encoding method, which corresponds to an inverse process of the image decoding method, will be described through various embodiments.

Figure 2:
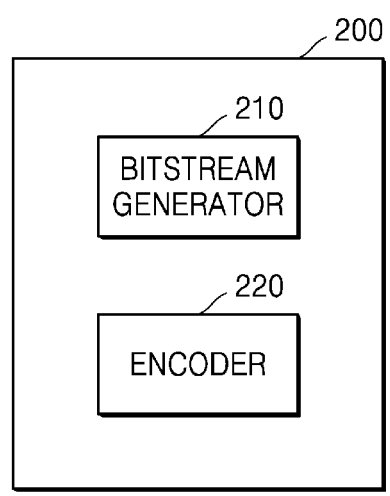
FIG. 2 is a block diagram of an image encoding apparatus according to an embodiment.

FIG. 2 is a block diagram of the image encoding apparatus 200 capable of encoding an image based on at least one of block shape information and split shape mode information, according to an embodiment.

The image encoding apparatus 200 may include an encoder 220 and a bitstream generator 210. The encoder 220 may receive an input image and encode the input image. The encoder 220 may obtain at least one syntax element by encoding the input image. The syntax element may include at least one of a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, and a transform index. The encoder 220 may determine a context model based on the block shape information including at least one of a shape, a direction, a ratio between a width and a height, and a size of a coding unit.

The bitstream generator 210 may generate a bitstream based on the encoded input image. For example, the bitstream generator 210 may generate the bitstream by entropy encoding the syntax element based on the context model. Also, the image encoding apparatus 200 may transmit the bitstream to the image decoding apparatus 100.

According to an embodiment, the encoder 220 of the image encoding apparatus 200 may determine a shape of the coding unit. For example, the coding unit may have a square shape or a non-square shape, and information indicating the square shape, or the non-square shape may be included in the block shape information.

According to an embodiment, the encoder 220 may determine a shape into which the coding unit is to be split. The encoder 220 may determine a shape of at least one coding unit included in the coding unit, and the bitstream generator 210 may generate the bitstream including the split shape mode information including information about the shape of the coding unit.

According to an embodiment, the encoder 220 may determine whether to or not to split the coding unit. When the encoder 220 determines that only one coding unit is included in the coding unit or the coding unit is not split, the bitstream generator 210 may generate the bitstream including the split shape mode information indicating that the coding unit is not split. Also, the encoder 220 may split the coding unit into a plurality of coding units, and the bitstream generator 210 may generate the bitstream including the split shape mode information indicating that the coding unit is split into the plurality of coding units.

According to an embodiment, information indicating the number of coding units into which the coding unit is to be split or a direction in which the coding unit is to be split may be included in the split shape mode information. For example, the split shape mode information may indicate to split the coding unit in at least one of a vertical direction and a horizontal direction or may indicate to or not to split the coding unit.

The image encoding apparatus 200 may determine information about a split shape mode, based on the split shape mode of the coding unit. The image encoding apparatus 200 may determine a context model based on at least one of a shape, a direction, a ratio between a width and a height, and a size of the coding unit. Also, the image encoding apparatus 200 may generate the information about the split shape mode for splitting the coding unit as a bitstream based on the context model.

In order to determine the context model, the image encoding apparatus 200 may obtain an arrangement for making a correspondence between at least one of the shape, the direction, the ratio between the width and the height, and the size of the coding unit, and an index for the context model. The image encoding apparatus 200 may obtain, from the arrangement, the index for the context model based on at least one of the shape, the direction, the ratio between the width and the height, and the size of the coding unit. The image encoding apparatus 200 may determine the context model based on the index for the context model.

In order to determine the context model, the image encoding apparatus 200 may determine the context model further based on block shape information including at least one of a shape, a direction, a ratio between a width and a height, and a size of a neighboring coding unit adjacent to the coding unit. Also, the neighboring coding unit may include at least one of the plurality of coding units located at the lower left, left, upper left, top, upper right, right, and lower right of the coding unit.

Also, the image encoding apparatus 200 may compare a width of the upper neighboring coding unit with a width of the coding unit, in order to determine the context model. Also, the image encoding apparatus 200 may compare heights of the left and right neighboring coding units with a height of the coding unit. Also, the image encoding apparatus 200 may determine the context model based on results of the comparison.

The operation of the image encoding apparatus 200 include similar aspects as the operation of the image decoding apparatus 100 described with reference to FIGS. 3 through 19, and thus, detailed descriptions thereof will be omitted.

Moreover, the term 'tool' used herein refers to element technology or algorithm used to encode and decode an image. An image encoding apparatus encodes an image based on a tool selected from among a plurality of tools, and an image decoding apparatus identifies the tool selected by the image encoding apparatus and reconstructs the image based on the identified tool.

In detail, the tool may include a tool related to a method of splitting an image, a tool used for prediction-encoding/prediction-decoding, a tool used for quantization/inverse quantization, a tool used for transform/inverse transform, a tool used for filtering, etc.

For example, the tool used for prediction-encoding/prediction-decoding may include an inter prediction tool, an intra prediction tool, a skip tool, a direct tool, an adaptive motion vector prediction (AMVP) tool, an affine tool, a bi-optical flow (BIO) tool, a decoder-side motion vector refinement (DMVR) tool, an illumination compensation (IC) tool, an overlapped block motion compensation (OBMC) tool, an inter prediction refinement (IPR) tool, etc.

Also, the tool used for transform/inverse transform may include a multiple transform (MT) tool, a non-separable secondary transform (NSST) tool, a rotational transform (ROT) tool, a discrete sine transform (DST) tool, a discrete cosine transform (DCT) tool, etc.

Also, the tool for filtering may include a deblocking tool, a sample adaptive offset (SAO) tool, a bilateral filter (BF) tool, an adaptive loop filter (ALF) tool, etc.

In general, a significantly large number of tools are defined in the codec standard. Depending on the field to which a codec is applied, it may be appropriate to use only some of many tools. To this end, a set of tools used in a specific application is defined as a profile when a standard is established.

Information on a profile to which a bitstream conforms is signaled to a decoder through a sequence parameter set or the like, and the decoder may identify whether it has the capability to decode the bitstream according to profile information extracted from the sequence parameter set or the like.

As the application field diversifies, the demand for various profiles is increasing. However, in order to define a new profile after the standard is established, a standard update procedure, etc. should be performed. Thus, it may be difficult to quickly define the profile according to the development of a new application field. For example, when a tool A, a tool B, a tool C, and a tool D suitable for a first application field are defined as a first profile, in a case in which a codec that supports only the tool A and the tool B is required due to the introduction of a new second application field, the tool A and the tool B should be defined as a second profile. However, newly defining the second profile in the standard may be burdensome in view of time and cost.

According to an embodiment of the disclosure, the introduction of a new application field may be quickly responded to by signaling information on a set of tools required for encoding and decoding an image among various tools.

Hereinafter, a method of encoding an image and a method of decoding an image based on information indicating a set of tools will be described.

Figure 20:
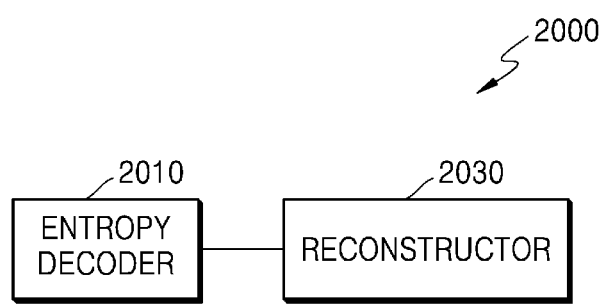
FIG. 20 is a block diagram illustrating a configuration of an image decoding apparatus according to an embodiment.

FIG. 20 is a block diagram illustrating a configuration of an image decoding apparatus 2000, according to an embodiment.

Referring to FIG. 20, the image decoding apparatus 2000 may include an entropy decoder 2010 and a reconstructor 2030.

The entropy decoder 2010 illustrated in FIG. 20 may correspond to the bitstream obtainer 110 illustrated in FIG. 1, and the reconstructor 2030 may correspond to the decoder 120 illustrated in FIG. 1. Also, the entropy decoder 2010 may correspond to the entropy decoder 1955 illustrated in FIG. 19, and the reconstructor 2030 may correspond to the inverse quantizer 1960, the inverse transformer 1965, the inter predictor 1970, the intra predictor 1975, the post-reconstruction filter 1980, and the in-loop filter 1985.

The entropy decoder 2010 and the reconstructor 2030 according to an embodiment may be implemented as at least one processor. The image decoding apparatus 2000 may include at least one memory (not illustrated) storing input/output data of the entropy decoder 2010 and the reconstructor 2030. Also, the image decoding apparatus 2000 may include a memory controller (not illustrated) configured to control data input/output of the memory (not illustrated).

The entropy decoder 2010 obtains a bitstream generated as a result of encoding an image sequence including one or more images. The entropy decoder 2010 obtains, from the bitstream, syntax elements for reconstructing the image sequence. Binary values corresponding to the syntax elements may be included in the bitstream according to a hierarchical structure of the image. The entropy decoder 2010 may obtain the syntax elements by performing entropy coding on the binary values included in the bitstream.

Figure 21:
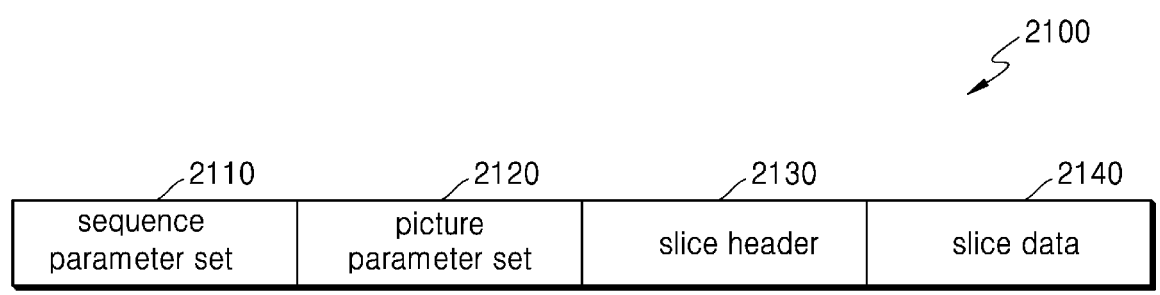
FIG. 21 is a diagram of a structure of a bitstream generated according to a hierarchical structure of an image.

FIG. 21 is a diagram of a structure of a bitstream 2100 generated according to a hierarchical structure of an image.

Referring to FIG. 21, the bitstream 2100 may include a sequence parameter set 2110, a picture parameter set 2120, a slice header 2130, and slice data 2140.

Each of the sequence parameter set 2110, the picture parameter set 2120, the slice header 2130, and the slice data 2140 includes syntax elements used in each layer according to the hierarchical structure of the image.

In detail, the sequence parameter set 2110 includes syntax elements used for an image sequence including one or more images.

The picture parameter set 2120 includes syntax elements used in one image and may refer to the sequence parameter set 2110.

The slice header 2130 includes syntax elements used in a slice determined in an image and may refer to the picture parameter set 2120 and the sequence parameter set 2110.

Also, the slice data 2140 includes syntax elements used in a block determined in a slice and may refer to the slice header 2130, the picture parameter set 2120, and the sequence parameter set 2110.

In an embodiment, the slice data 2140 may include a syntax element related to a CTU determined in a slice, a syntax element related to a CU, a syntax element related to a transform unit (TU), a syntax element related to a residual block, etc.

The structure of the bitstream 2100 illustrated in FIG. 21 is merely an example. That is, some of the sequence parameter set 2110, the picture parameter set 2120, the slice header 2130, and the slice data 2140 may not be included in the bitstream 2100, and a parameter set not illustrated, for example, a video parameter set, may be included in the bitstream 2100.

The reconstructor 2030 may reconstruct an image by using the syntax elements extracted from the bitstream.

The reconstructor 2030 may identify a tool used for the image sequence from a sequence parameter set and reconstruct the image sequence by using the syntax elements extracted from slice data or the like based on the identified tool. When a certain tool has been used for the image sequence, it means that the certain tool is applied to splitting of a coding unit determined in an image constituting the image sequence, prediction coding of a coding unit, transformation of a residual block, quantization of a residual block, or filtering of a reconstructed block. When the certain tool has been used for a first coding unit and has not been used for a second coding unit, it may be determined that the certain tool has been used for an image sequence including the first coding unit and the second coding unit.

The reconstructor 2030 may identify a tool allowed to decode a bitstream, for example, slice data or the like, by using a first tool set index extracted from the sequence parameter set.

When a certain tool is allowed to decode a bitstream, it means that the image decoding apparatus 2000 should have the capability to use the certain tool to decode a bitstream, and does not indicate whether the certain tool has actually been used to encode the image sequence.

The first tool set index indicates a tool allowed to decode a bitstream, for example, a slice header and/or slice data of a bitstream, among a plurality of predetermined tools. Among the plurality of tools, tools that are allowed to decode a bitstream and tools that are not allowed to decode a bitstream may be identified based on the first tool set index. In this case, the decoding of the bitstream may refer to extracting syntax elements from a bitstream and reconstructing an image from the extracted syntax elements according to a certain tool.

The first tool set index may be represented as a first bit string of a certain length. For example, the first bit string may include 32 bits. Each of a plurality of bits constituting the first bit string may indicate whether a plurality of tools are allowed to decode a bitstream.

FIG. 22 is a table illustrating tools corresponding to respective bits of a first bit string. FIG. 22 illustrates a total of 21 tools, including a binary and ternary splits (btt) tool corresponding to a bit having an index of 0, a history-based merging candidates (hmvp) tool corresponding to a bit having an index of 20, and tools corresponding to bit index numbers 1-19. Processing procedures of some of the tools will be described below.

As illustrated in FIG. 22, each bit constituting the first bit string may correspond to any one tool among a plurality of tools. The bit having the index of 0, for example, a bit located at the rightmost side in the first bit string, may indicate whether the btt tool is allowed, and the bit having the index of 1, for example, a bit located on the left side of the bit having the index of 0, may indicate whether a split unit code ordering (suco) is allowed. Bit indexes illustrated in FIG. 22 indicate locations of bits included in the first bit string. For example, a bit index may indicate how far apart a bit is in the left direction with respect to the rightmost bit of the first bit string.

It may be identified that when a value of the bit having the index of 0 is 1, the btt tool is allowed to decode the bitstream, and when the value of the bit having the index of 0 is 0, the btt tool is not allowed to decode the bitstream. Also, it may be identified that when a value of the bit having the index of 1 is 1, the suco tool is allowed to decode the bitstream, and when the value of the bit having the index of 1 is 0, the suco tool is not allowed to decode the bitstream.

The first tool set index restricts the capability of the decoder to decode a bitstream. Accordingly, the reconstructor 2030 may identify whether it has the capability to reconstruct the bitstream from a value of each bit constituting the first bit string. For example, when the value of the bit having the index of 0 is 1 and the btt tool is unusable by the reconstructor 2030 (i.e., the reconstructor 2030 cannot use the btt tool), the reconstructor 2030 may determine that the bitstream is undecodable. When a tool identified from the first tool set index, that is, a tool allowed to decode the bitstream, is unusable, the reconstructor 2030 may stop decoding the bitstream.

FIG. 23 is a diagram for describing that a bitstream is undecodable when a tool required for decoding a bitstream is not usable by the image decoding apparatus 2000.

FIG. 23 illustrates a syntax structure related to split_unit in slice data included in a bitstream. In S2310, it is determined whether sps_btt_flag is 1. sps_btt_flag, which is a syntax element extracted from a sequence parameter set of a bitstream, indicates whether the btt tool has been used for an image sequence. When a value of sps_btt_flag is 1, it is identified that the btt tool has been used for the image sequence, and when the value of sps_btt_flag is 0, it is identified that the btt tool has not been used for the image sequence.

As will be described below, in order for sps_btt_flag to be 1, a value of a bit corresponding to the btt tool in the first bit string should be 1. That is, it should be identified from the first tool set index that the btt tool is a tool allowed to decode the bitstream.

When sps_btt_flag is 1, btt_split_flag, btt_split_dir, and btt_split_type are extracted from S2320, S2330, and S2340, respectively. btt_split_flag indicates whether a current coding unit is split into lower coding units, and btt_split_dir indicates whether the current coding unit is split in a width direction or a height direction. Also, btt_split_type indicates whether the current coding unit is split into two lower coding units or three lower coding units.

When the image decoding apparatus 2000 has the capability to use the btt tool and the btt tool has been used to encode the image sequence, the reconstructor 2030 reconstructs the current coding unit by splitting the current coding unit into two or three lower coding units according to btt_split_flag, btt_split_dir, and btt_split_type. However, when the image decoding apparatus 2000 is not capable to use the btt tool, bins included in the bitstream may not be identified as corresponding to btt_split_flag, btt_split_dir, and btt_split_type, and it may be incorrectly determined that the bins correspond to syntax elements of another tool. Accordingly, in the disclosure, by notifying in advance what capability the image decoding apparatus 2000 should have in order to decode the bitstream through the first tool set index, an image may be prevented from being inaccurately reconstructed.

Moreover, the entropy decoder 2010 obtains, from the sequence parameter set, tool flags indicating whether a plurality of tools have been used for the image sequence together with the first tool set index. The tool flags may indicate whether a predetermined tool has been used to encode the image sequence, like sps_btt_flag described above. For example, sps_btt_flag having a value of 1 indicates that the btt tool has been used for the image sequence, and sps_btt_flag having a value of 0 indicates that the btt tool has not been used for the image sequence.

The reconstructor 2030 identifies a tool used to encode the image sequence from the tool flags and reconstructs the image sequence by decoding slice data determined in the image sequence based on the identified tool.

In an embodiment, values of the tool flags indicating whether the plurality of tools have been used are restricted according to a value of the first tool set index. In detail, when a value of a bit at a certain location in the first bit string corresponding to the first tool set index is 1, a tool flag indicating whether a tool corresponding to the bit has been used may have a value of 0 or 1. When the value of the bit at the certain location in the first bit string is 0, the tool flag indicating whether the tool corresponding to the bit has been used may have only a value of 0. That is, when a certain tool is not allowed to decode the bitstream, a tool flag of the certain tool should indicate that the certain tool has not been used for the image sequence, and when the certain tool is allowed to decode the bitstream, the tool flag of the certain tool should indicate that the certain tool has been used or has not been used for the image sequence.

FIG. 24 is a diagram illustrating a syntax structure of a sequence parameter set.

Referring to FIG. 24, in S2410, profile_idc is extracted from a bitstream. profile_idc indicates a profile to which the bitstream conforms.

In an embodiment, profile_idc having a value of 0 may indicate that the bitstream has been generated according to a profile in which the tools illustrated in FIG. 22 are unavailable (hereinafter, referred to as a baseline profile). As described above, the image encoding apparatus and the image decoding apparatus 2000 use various tools to encode/decode an image, and the baseline profile is a profile defined as that predetermined default tools may be used to encode/decode an image.

profile_idc having a value of 1 may indicate that the bitstream has been generated according to a profile in which the tools illustrated in FIG. 22 are available (hereinafter, referred to as a main profile). The main profile is a profile defined as that predetermined default tools and predetermined advanced tools (e.g., the tools illustrated in FIG. 22) may be used to encode/decode an image.

In S2420, level_idc is extracted. level_idc indicates a resolution of an image to be encoded/decoded.

In S2430, toolset_idc_h corresponding to the first tool set index described above is extracted. FIG. 24 illustrates that toolset_idc_h includes 32 bits, but a first bit string corresponding to toolset_idc_h may include different numbers of bits.

In an embodiment, when profile_idc indicates the baseline profile, a value of toolset_idc_h is restricted to 0. That is, values of all bits constituting the first bit string are restricted to 0. In contrast, when profile_idc indicates the main profile, the value of toolset_idc_h may indicate a value of 0 or greater. That is, bits constituting the first bit string may each have a value of 0 or 1, and accordingly, tools allowed and not allowed to decode the bitstream may be identified from among the advanced tools.

In S2440, toolset_idc_l corresponding to a second tool set index may be extracted. toolset_idc_l may be represented as a second bit string, and a length of toolset_idc_l may be the same as a length of toolset_idc_h.

toolset_idc_l indicates a tool used for the image sequence among a plurality of tools (e.g., the advanced tools described above). toolset_idc_h indicates which tools are allowed to decode the bitstream and which tools are not allowed to decode the bitstream, whereas toolset_idc_l indicates a tool essential to decode the bitstream. Although it is identified through toolset_idc_h that a certain tool is allowed to decode the bitstream, the tool may or may not be used for the image sequence. However, when a value of a bit corresponding to the certain tool in the second bit string corresponding to toolset_idc_l is 1, it is identified that the tool has been used for the image sequence. That is, when the value of the bit corresponding to the certain tool in the second bit string corresponding to toolset_idc_l is 1, a tool flag corresponding to the tool may have only a value of 1.

When the value of the bit corresponding to the certain tool in the second bit string corresponding to toolset_idc_l is 0, it is identified that the tool may have been used for the image sequence. That is, when a value of a bit corresponding to a certain tool in the first bit string corresponding to toolset_idc_h is 1 and a value of a bit corresponding to the same tool in the second bit string corresponding to toolset_idc_l is 0, the tool may or may not have been used for the image sequence. In other words, when the value of the bit corresponding to the certain tool in the first bit string corresponding to toolset_idc_h is 1 and the value of the bit corresponding to the same tool in the second bit string corresponding to toolset_idc_l is 0, a tool flag corresponding to the tool may have a value of 0 or 1.

Each bit constituting the second bit string corresponding to toolset_idc_l may correspond to each of the plurality of tools, and a correspondence relationship between the second bit string and the plurality of tools may be the same as a correspondence relationship between the first bit string illustrated in FIG. 22 and the plurality of tools.

A value of each bit constituting the second bit string may be restricted according to a value of each bit constituting the first bit string. When a value of a bit at a certain location in the first bit string is 0, it is identified that a tool corresponding to the bit is not allowed to decode the image sequence, but when a value of a bit at a certain location in the second bit string is 1, it is identified that a tool corresponding to the bit has been used for the image sequence. Thus, a contradiction may occur between the first bit string and the second bit string. Accordingly, when the value of the bit at the certain location in the first bit string is 0, a value of a bit at the same location in the second bit string is restricted to 0.

In S2450, tool flags indicating whether the plurality of tools have been used for the image sequence are obtained. As described above, a tool flag having a value of 0 indicates that a tool has not been used for the image sequence, and a tool flag having a value of 1 indicates that a tool has been used for the image sequence.

Values of the tool flags are restricted according to values of bits of the first tool set index (i.e., toolset_idc_h) and the second tool set index (i.e., toolset_idc_l). As described above, when the value of the bit at the certain location in the first bit string is 0, a tool flag of a tool corresponding to the bit at the certain location should have a value of 0, and when the value of the bit at the certain location is 1, the tool flag of the tool corresponding to the bit at the certain location may have a value of 0 or 1.

In an embodiment, when the value of the bit at the certain location in the second bit string is 1, a tool flag of a tool corresponding to the bit at the certain location should have a value of 1, and when the value of the bit at the certain location is 0, the tool flag of the tool corresponding to the bit at the certain location may have a value of 0 or 1.

Values of tool flags may be set according to a value of the first tool set index and a value of the second tool set index. The values of the tool flags will be described with reference to FIG. 25.

FIG. 25 is a diagram illustrating values of tool flags restricted according to the value of the first tool set index and the value of the second tool set index.

In FIG. 25, when sps_btt_flag <=toolset_idc_h & 0x1 means that when a value of the rightmost bit (a bit having an index of 0) in the first bit string is 1, sps_btt_flag may have a value of 0 or 1. Also, sps_btt_flag >=toolset_idc_l & 0x1 means that when a value of a bit having an index of 0 in the second bit string is 1, sps_btt_flag may have a value of 1. That is, when the value of the bit having the index of 0 in the first bit string is 1 and the value of the bit having the index of 0 in the second bit string is 1, the value of sps_btt_flag is restricted to 1. Also, when the value of the bit having the index of 0 in the first bit string is 1 and the value of the bit having the index of 0 in the second bit string is 0, the value of sps_btt_flag is restricted to 0 or 1. In addition, when the value of the bit having the index of 0 in the first bit string is 0 and the value of the bit having the index of 0 in the second bit string is 0, the value of sps_btt_flag is restricted to 0. As described above, when the value of the bit having the index of 0 in the first bit string is 0, the bit having the index of 0 in the second bit string may not have a value of 1.

As illustrated in FIG. 25, a value of sps_suco_flag is restricted according to a value of a bit having an index of 1 in the first bit string and a value of a bit having an index of 1 in the second bit string, and a value of sps_amvr_flag is restricted according to a value of a bit having an index of 2 in the first bit string and a value of a bit having an index of 2 in the second bit string.

Hereinafter, processing procedures of some tools available in the main profile will be described.

An image is divided into slices, and a largest coding unit of a certain size included in a slice is hierarchically split into at least one coding unit. Each coding unit is prediction-encoded/prediction-decoded through inter prediction or intra prediction. The btt tool is a tool for splitting a current coding unit determined from a largest coding unit into two lower coding units or three coding units and encoding/decoding the lower coding units. When splitting the current coding unit into two or three lower coding units and encoding the lower coding units is efficient in view of cost (e.g., rate-distortion cost), the btt tool may be used. As described above, the btt tool is available in the main profile. In the baseline profile, the current coding unit may be encoded as it is without splitting or may be encoded after being split into four lower coding units.

The suco tool is a technique for increasing coding performance by changing an encoding/decoding order of coding units. According to the suco tool, when a split direction of coding units is a vertical direction, an encoding/decoding order of lower coding units may be determined as an order from a left lower coding unit to a right lower coding unit or an order from the right lower coding unit to the left lower coding unit. In the baseline profile, lower coding units split from the coding unit or the largest coding unit may be encoded/decoded in a predetermined order, for example, the order from the left lower coding unit to the right lower coding unit.

An adaptive motion vector resolution (amvr) tool is a tool for obtaining a motion vector used for inter prediction of a current coding unit at any one of a plurality of resolutions. When a motion vector is obtained at only one resolution as the size of an image increases, many bits may be required to express the motion vector. The resolution may refer to precision of a location of a pixel that a motion vector may indicate, among pixels included in a reference image (or an interpolated reference image). When the resolution of the motion vector has N pixel units (where N is a rational number), it means that the motion vector may have precision in N pixel units. In the amvr tool, a differential motion vector between the motion vector of the current coding unit and a prediction motion vector is downscaled according to a motion vector resolution of the current coding unit and then signaled to the decoder. The decoder upscales the downscaled differential motion vector and then reconstructs the motion vector of the current coding unit. In the baseline profile, the motion vector of the current coding unit may be obtained at one resolution. For example, in the baseline profile, as in an AMVP mode defined in the HEVC standard, the differential motion vector between the motion vector of the current coding unit and the prediction motion vector may be signaled to the decoder without downscaling, and the decoder may reconstruct the motion vector of the current coding unit by combining the differential motion vector and the prediction motion vector.

A merge with motion vector difference (mmvd) tool is a tool in which the concept of a differential motion vector is applied to a merge mode defined in the HEVC standard. In the merge mode, motion vectors of blocks located around the current coding unit are added to a candidate list, and any one of the motion vectors in the candidate list is selected as a motion vector of the current coding unit. Information indicating any one of the motion vectors in the candidate list is signaled to the decoder. Because the motion vector of the current coding unit may be expressed only with the information indicating any one of the motion vectors in the candidate list, the number of bits required to express the motion vector may be reduced. In general, in the merge mode, a differential motion vector between the motion vector of the current coding unit and the motion vector selected from the candidate list is not signaled to the decoder. The mmvd tool is different from the merge mode defined in the HEVC standard in that the differential motion vector between the motion vector of the current coding unit and the motion vector selected from the candidate list is signaled to the decoder. In the mmvd tool, information indicating in which direction and by what distance the motion vector selected from the candidate list should be changed is signaled to the decoder. That is, information indicating a variation distance and a variation direction of the motion vector selected from the candidate list is signaled to the decoder as the differential motion vector. The decoder obtains the motion vector of the current coding unit by changing the motion vector selected from the candidate list according to the variation distance and the variation direction. In the baseline profile, the mmvd tool may not be used for inter prediction of the current coding unit, and an existing merge mode, skip mode, and AMVP mode may be used instead.

The dmvr tool is a technique in which a decoder improves two motion vectors used for bidirectional inter prediction. In the dmvr tool, more accurate motion vectors are obtained by improving two initial motion vectors signaled from an encoder. In the baseline profile, motion vectors signaled from the encoder may not be separately improved and may be used as prediction motion vectors of the current coding unit or may be used as motion vectors of the current coding unit.

An adaptive loop filter (alf) tool is a filtering technique for suppressing artifacts of reconstructed images and improving visual and objective quality. In the alf tool, two types of diamond filter patterns (e.g., 5×5 and 7×7) are defined for luma filtering, and one type of diamond pattern (e.g., 5×5) is defined for chroma filtering. In the baseline profile, the alf tool may not be used, and deblocking filtering and/or SAO filtering may be used for a reconstructed image.

A Hadamard transform-domain filter (htdf) tool is a technique for filtering a reconstructed image following the alf tool. The htdf tool reduces ringing artifacts caused by quantization of residual coefficients. The htdf tool may be applied to a reconstructed luma block when a quantization parameter (QP) is greater than a certain value. A transform core is a 2×2 Hadamard transform, which in turn may be a 3×3 low-pass smoothing filter. In the baseline profile, the htdf tool may not be used, and deblocking filtering and/or SAO filtering may be used for a reconstructed image.

An adaptive transform selection (ats) tool is a technique that enables discrete sine transform (DST)-VII transform and DST-VIII transform to be applied to transform/inverse transform of a residual block, in addition to DCT-II transform available in the baseline profile.

An improved delta qp signaling processes (dquant) tool may be an improved tool as a signaling technique of a differential quantization parameter (i.e., a difference between a prediction quantization parameter and a quantization parameter) at the level of a coding unit. In this case, the improved tool may be a tool that further identifies a value of cuQpDeltaCode for a coding unit (including a coding unit being split) based on a size (or width) of the coding unit, a size (or width) of a differential quantization parameter signaling unit, and a size of a largest coding unit, and obtains a syntax element regarding a differential quantization parameter based on the value. In the baseline profile, the syntax element regarding the differential quantization parameter may be obtained without identifying the value of cuQpDeltaCode (or by identifying only a default value or disregarding the value of cuQpDeltaCode).

An hmvp tool is a technique that includes motion vectors of spatio-temporally adjacent blocks in a candidate list in a merge mode or an AMVP mode, and further includes motion vectors of coding units far from the current coding unit in the candidate list. In the baseline profile, motion vectors of blocks adjacent to the current coding unit may be included in the candidate list, and the motion vectors of the coding units far from the current coding unit may not be used as candidates.

In FIGS. 22 and 25, it has been described that there are 21 tools available only in the main profile. Specific operation processes of tools other than the above-described tools are not essential parts of the technical idea of the disclosure, and thus, detailed descriptions thereof are not provided herein.

Figure 26:
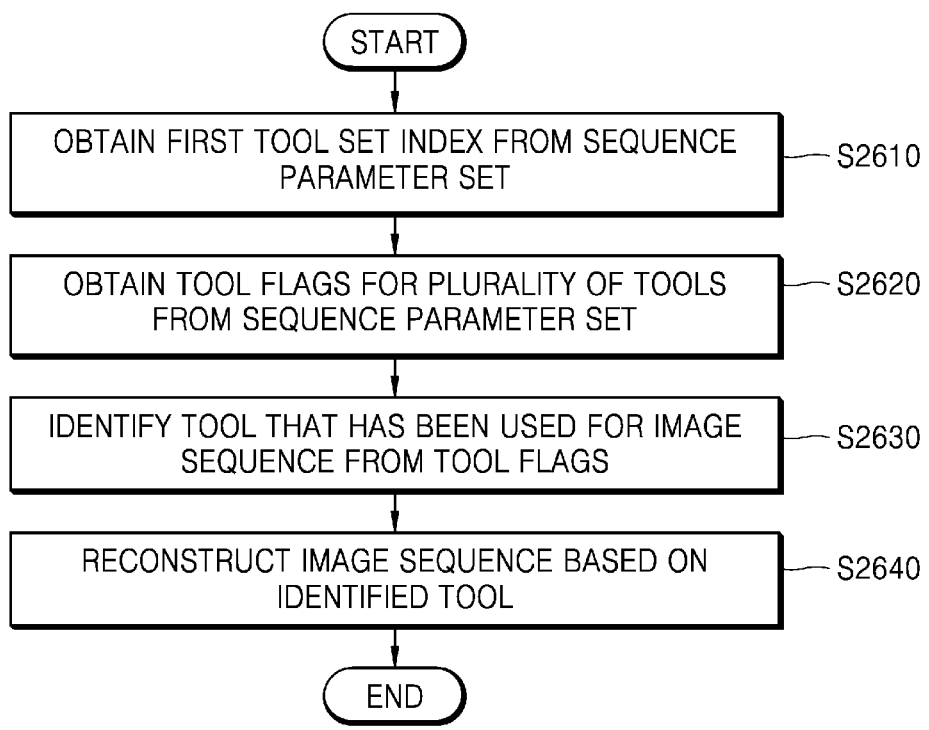
FIG. 26 is a flowchart for describing an image decoding method according to an embodiment.

FIG. 26 is a flowchart for describing an image decoding method according to an embodiment.

In operation S2610, the image decoding apparatus 2000 obtains a first tool set index from a sequence parameter set of a bitstream. The first tool set index may indicate one or more tools that are allowed to decode the bitstream. The first tool set index may be represented as a first bit string of a certain length, and each bit constituting the first bit string indicates whether a tool corresponding to the bit is allowed to decode the bitstream. The first bit string may be constituted with a plurality of bits that correspond to a plurality of different tools in a one-to-one correspondence.

As described above, the image decoding apparatus 2000 may obtain a second tool set index from the sequence parameter set of the bitstream. The second tool set index may be represented as a second bit string of a certain length, and each bit constituting the second bit string may indicate whether the plurality of tools have been used for an image sequence. It may be indicated that when any one bit constituting the second bit string have a value of 1, a corresponding tool has been used for the image sequence, and when any one bit constituting the second bit string has a value of 0, a corresponding tool may or may not have been used for the image sequence.

In operation S2620, the image decoding apparatus 2000 obtains tool flags for the plurality of tools from the sequence parameter set. Each of the tool flags indicates whether each of the plurality of tools has been used for the image sequence. Values of the tool flags are restricted according to a value of the first tool set index. The values of the tool flags may be restricted according to the value of the first tool set index and a value of the second tool set index.

In operation S2630, the image decoding apparatus 2000 identifies a tool used for the image sequence from the tool flags and reconstructs the image sequence based on the tool identified in operation S2640.

Figure 27:
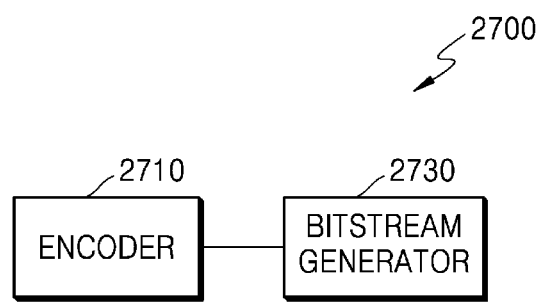
FIG. 27 is a block diagram of a configuration of an image encoding apparatus according to an embodiment.

FIG. 27 is a block diagram of a configuration of an image encoding apparatus 2700, according to an embodiment.

Referring to FIG. 27, the image encoding apparatus 2700 includes an encoder 2710 and a bitstream generator 2730.

The encoder 2710 illustrated in FIG. 27 may correspond to the encoder 220 illustrated in FIG. 2, and the bitstream generator 2730 may correspond to the bitstream generator 210 illustrated in FIG. 2. Also, the encoder 2710 may correspond to the inter predictor 1905, the intra predictor 1910, the transformer 1920, the quantizer 1925, the inverse quantizer 1933, the inverse transformer 1935, the post-reconstruction filter 1940, and the in-loop filter 1945, illustrated in FIG. 19, and the bitstream generator 2730 may correspond to the entropy encoder 1930 illustrated in FIG. 19.

The encoder 2710 and the bitstream generator 2730 according to an embodiment may be implemented as at least one processor. The image encoding apparatus 2700 may include at least one memory storing input/output data of the encoder 2710 and the bitstream generator 2730. Also, the image encoding apparatus 2700 may include a memory controller configured to control data input/output of the memory.

The encoder 2710 selects at least one tool from among a plurality of predetermined tools and encodes an image sequence based on the selected tool. The encoder 2710 may encode the image sequence by using an advanced tool selected from among a plurality of predetermined advanced tools and a default tool selected from among a plurality of default tools. Syntax elements may be generated as a result of encoding the image sequence. The encoder 2710 may split an image constituting the image sequence into blocks (e.g., a slice, a largest coding unit, a coding unit, and/or a transform unit) in order to encode the image sequence and may encode the split blocks.

The encoder 2710 generates a first tool set index indicating a tool allowed to decode a bitstream, for example, slice data of the bitstream. The encoder 2710 generates a first tool set index indicating what capability an image decoding apparatus should have in order to decode a bitstream.

In an embodiment, the encoder 2710 may generate a syntax element (profile_idc described above) indicating a profile conformed by a bitstream to be generated. A value of the first tool set index may be restricted according to the syntax element indicating the profile. When all of the plurality of predetermined tools (i.e., advanced tools) have not been used to encode the image sequence, the encoder 2710 may generate profile_idc to indicate a baseline profile and may set the value of the first tool set index to 0. When at least one of the plurality of predetermined tools (i.e., advanced tools) has been used to encode the image sequence, the encoder 2710 may generate profile_idc to indicate a main profile.

In an embodiment, the encoder 2710 may generate a second tool set index indicating a tool used to encode the image sequence from among the plurality of predetermined tools. The first tool set index and the second tool set index may be represented by the same number of bits.

The encoder 2710 generates tool flags each indicating whether each of the plurality of tools has been used to encode the image sequence. In an embodiment, values of the tool flags are restricted according to values of the first tool set index and/or the second tool set index. A condition in which the values of the tool flags are restricted according to the values of the first tool set index and/or the second tool set index has been described with reference to FIG. 25, and thus, detailed descriptions thereof will not be provided herein.

The bitstream generator 2730 entropy codes syntax elements generated by the encoder 2710 and generates a bitstream including bins corresponding to the syntax elements. As described above, the bitstream may include a sequence parameter set, a picture parameter set, a slice header, and slice data according to the hierarchical structure of the image.

The bitstream generator 2730 includes, in the sequence parameter set of the bitstream, information indicating a profile, the first tool set index, and tool flags each indicating whether each of the plurality of tools has been used. Also, the bitstream generator 2730 includes syntax elements generated as a result of encoding the image sequence in at least one of the sequence parameter set, the picture parameter set, the slice header, and the slice data according to the hierarchical structure of the image. For example, the bitstream generator 2730 may include, in the slice data, information indicating a method of splitting the largest coding unit, information indicating a prediction mode of the current coding unit, and information indicating a motion vector required for prediction-decoding the current coding unit. Also, the bitstream generator 2730 may include, in the slice header, information indicating a type of a slice, information indicating whether a certain tool has been applied to blocks split from the slice, and information indicating a reference picture list to be referred to by a coding unit split from the slice.

Figure 28:
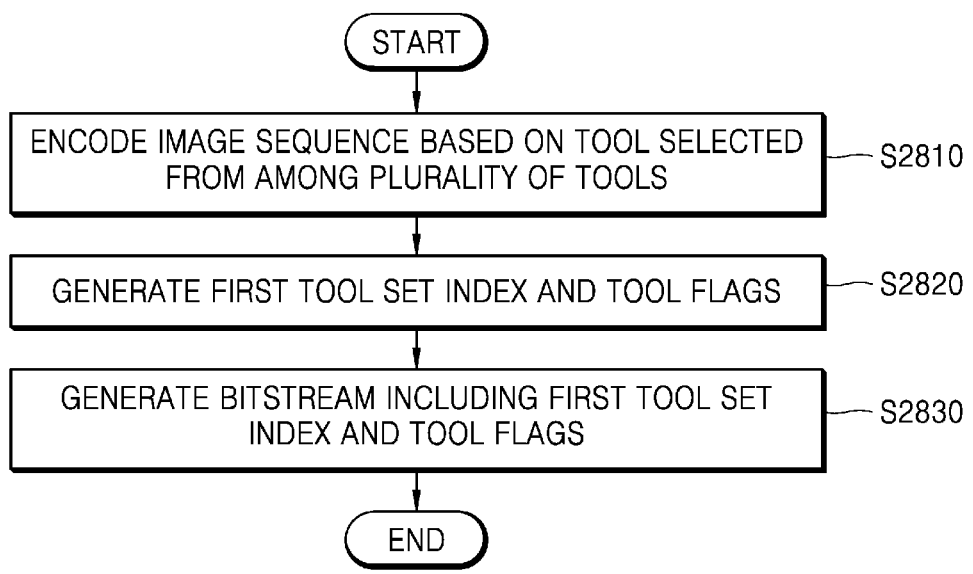
FIG. 28 is a flowchart for describing an image encoding method according to an embodiment.

FIG. 28 is a flowchart for describing an image encoding method according to an embodiment.

In operation S2810, an image encoding apparatus 2700 may select at least one tool from among a plurality of predetermined tools and may encode an image sequence by using the selected tool.

In operation S2820, the image encoding apparatus 2700 may generate a first tool set index indicating one or more tools that are allowed to decode a bitstream. The first tool set index may indicate a processing capability of an image decoder that is required to decode a bitstream that is encoded by the encoder 2710. The image encoding apparatus 2700 may also generate tool flags indicating whether each of the plurality of tools has been used to encode an image sequence.

In operation S2830, the image encoding apparatus 2700 may generate a bitstream including the first tool set index and the tool flags.

Moreover, the embodiments of the disclosure may be written as programs that are executable on a computer, and the programs may be stored in a medium.

The medium may continuously store the computer-executable programs or may temporarily store the computer-executable programs for execution or downloading. Also, the medium may be any one of various recording media or storage media in which a single piece or plurality of pieces of hardware are combined, and the medium is not limited to those directly connected to a certain computer system but may be distributed on a network. Examples of the medium include magnetic media (e.g., a hard disk, a floppy disk, and a magnetic tape), optical recording media (e.g., compact disc-read only memory (CD-ROM) and a digital versatile disc (DVD)), magneto-optical media (e.g., a floptical disk), a read-only memory (ROM), a random-access memory (RAM), a flash memory, etc., which are configured to store program instructions. Also, other examples of the medium may include recording media and storage media managed by application stores distributing applications or by websites, servers, and the like supplying or distributing other various types of software.

So far, although the technical idea of the disclosure has been described based on the preferred embodiments, the technical idea of the disclosure is not limited to the above-described embodiments, and various modifications and changes may be made within the scope of the technical idea of the disclosure by one of ordinary skill in the art.

What is claimed is:

1. An image decoding method performed by an image decoding apparatus, the image decoding method comprising:

receiving a bitstream generated as a result of encoding an image sequence;

obtaining, from a sequence parameter set of the bitstream, a first tool set index and a second tool set index for indicating a tool allowed to decode the bitstream among a first tool and a second tool;

obtaining, from the sequence parameter set, a first tool flag indicating whether the first tool is used for the image sequence, and a second tool flag indicating whether the second tool is used for the image sequence;

from the first tool flag and the second tool flag, identifying a tool that is used for the image sequence; and reconstructing the image sequence based on the identified tool, wherein when a value of a first bit included in the first tool set index is 1 and a value of a first bit included in the second tool set index is 1, a value of the first tool flag is 1, when the value of the first bit included in the first tool set index is 1 and the value of the first bit included in the second tool set index is 0, the value of the first tool flag is 0 or 1, when the value of the first bit included in the first tool set index is 0 and the value of the first bit included in the second tool set index is 0, the value of the first tool flag is 0, when a value of a second bit included in the first tool set index is 1 and a value of a second bit included in the second tool set index is 1, a value of the second tool flag is 1, when the value of the second bit included in the first tool set index is 1 and the value of the second bit included in the second tool set index is 0, the value of the second tool flag is 0 or 1, and when the value of the second bit included in the first tool set index is 0 and the value of the second bit included in the second tool set index is 0, the value of the second tool flag is 0, wherein when the value of the first bit included in the first tool set index is 0, the value of the first bit included in the second tool set index is set to 0.

2. An image decoding apparatus comprising:
a memory storing instructions; and
at least one processor configured to execute the instructions to:
receive a bitstream generated as a result of encoding an image sequence;
obtain, from a sequence parameter set of the bitstream, a first tool set index and a second tool set index for indicating a tool allowed to decode the bitstream among a first tool and a second tool;
obtain, from the sequence parameter set, a first tool flag indicating whether the first tool is used for the image sequence, and a second tool flag indicating whether the second tool is used for the image sequence;
from the first tool flag and the second tool flag, identify a tool that is used for the image sequence; and
reconstruct the image sequence based on the identified tool,
wherein when a value of a first bit included in the first tool set index is 1 and a value of a first bit included in the second tool set index is 1, a value of the first tool flag is 1,
when the value of the first bit included in the first tool set index is 1 and the value of the first bit included in the second tool set index is 0, the value of the first tool flag is 0 or 1,
when the value of the first bit included in the first tool set index is 0 and the value of the first bit included in the second tool set index is 0, the value of the first tool flag is 0,
when a value of a second bit included in the first tool set index is 1 and a value of a second bit included in the second tool set index is 1, a value of the second tool flag is 1,
when the value of the second bit included in the first tool set index is 1 and the value of the second bit included in the second tool set index is 0, the value of the second tool flag is 0 or 1, and
when the value of the second bit included in the first tool set index is 0 and the value of the second bit included in the second tool set index is 0, the value of the second tool flag is 0, wherein when the value of the first bit included in the first tool set index is 0, the value of the first bit included in the second tool set index is set to 0.

3. An image encoding method performed by an image encoding apparatus, the image encoding method comprising:
encoding an image sequence based on at least one tool selected from among a first tool and a second tool;
generating a first tool set index and a second tool set index for indicating a tool allowed to decode a bitstream, among the first tool and the second tool;
generating a first tool flag indicating whether the first tool is used for the image sequence, and a second tool flag indicating whether the second tool is used for the image sequence; and
generating the bitstream including the first tool set index, the second tool set index, the first tool flag, and the second tool flag,
wherein when a value of a first bit included in the first tool set index is 1 and a value of a first bit included in the second tool set index is 1, a value of the first tool flag is 1,
when the value of the first bit included in the first tool set index is 1 and the value of the first bit included in the second tool set index is 0, the value of the first tool flag is 0 or 1,
when the value of the first bit included in the first tool set index is 0 and the value of the first bit included in the second tool set index is 0, the value of the first tool flag is 0,
when a value of a second bit included in the first tool set index is 1 and a value of a second bit included in the second tool set index is 1, a value of the second tool flag is 1,
when the value of the second bit included in the first tool set index is 1 and the value of the second bit included in the second tool set index is 0, the value of the second tool flag is 0 or 1, and
when the value of the second bit included in the first tool set index is 0 and the value of the second bit included in the second tool set index is 0, the value of the second tool flag is 0,
wherein when the value of the first bit included in the first tool set index is 0, the value of the first bit included in the second tool set index is set to 0.

4. A method of transmitting the bitstream generated by the image encoding method of claim 1.

* * * * *